(12) United States Patent
Kim et al.

(10) Patent No.: US 10,921,922 B2
(45) Date of Patent: Feb. 16, 2021

(54) MOBILE TERMINAL HAVING A TOUCH REGION TO OBTAIN FINGERPRINT INFORMATION

(71) Applicant: LG ELECTRONICS INC, Seoul (KR)

(72) Inventors: Youngsik Kim, Seoul (KR); Hongjo Shim, Seoul (KR); Aseo Cho, Seoul (KR); Chealhoon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 108 days.

(21) Appl. No.: 15/204,487

(22) Filed: Jul. 7, 2016

(65) Prior Publication Data

US 2017/0153743 A1 Jun. 1, 2017

(30) Foreign Application Priority Data

Nov. 27, 2015 (KR) .................. 10-2015-0167359

(51) Int. Cl.
  *G06F 3/041* (2006.01)
  *G06F 21/32* (2013.01)
  *G06K 9/00* (2006.01)
  *G06F 3/044* (2006.01)
  (Continued)

(52) U.S. Cl.
  CPC ........... *G06F 3/0416* (2013.01); *G02B 6/005* (2013.01); *G02B 6/0036* (2013.01); *G02B 6/0041* (2013.01); *G02B 6/0061* (2013.01); *G06F 3/044* (2013.01); *G06F 3/0414* (2013.01); *G06F 3/0421* (2013.01); *G06F 21/32* (2013.01); *G06K 9/0004* (2013.01); *G06K 9/00013* (2013.01); *G06F 2203/04101* (2013.01); *G06F 2203/04102* (2013.01); *G06F 2203/04103* (2013.01); *G06F 2203/04109* (2013.01)

(58) Field of Classification Search
  None
  See application file for complete search history.

(56) References Cited

U.S. PATENT DOCUMENTS

2007/0210163 A1 9/2007 Han
2012/0071149 A1 3/2012 Bandyopadhyay et al.
(Continued)

FOREIGN PATENT DOCUMENTS

| CN | 104035620 A | 9/2014 |
|---|---|---|
| JP | 2013-127727 A | 6/2013 |

(Continued)

*Primary Examiner* — Sepehr Azari
(74) *Attorney, Agent, or Firm* — Dentons US LLP

(57) ABSTRACT

A mobile terminal including a glass panel having a first and a second touch region. The second touch region is, at least in part, located within the first touch region and configured to obtain fingerprint information. The mobile terminal further includes a first and a second touch sensor respectively corresponding to the first and second touch regions, a light guide plate provided at a backside of the first and second touch sensors, and a light source provided on at least one side of the light guide plate, wherein the light guide plate includes a light guide plate body to propagate light from the light source, and windows such that brightness of the second touch region is substantially the same as brightness of a portion of the first touch region that is outside of the second touch region, the windows having different properties including at least one of size and density.

2 Claims, 39 Drawing Sheets

(51) Int. Cl.
*G06F 3/042* (2006.01)
*F21V 8/00* (2006.01)

(56) References Cited

U.S. PATENT DOCUMENTS

| | | | | |
|---|---|---|---|---|
| 2012/0321149 A1* | 12/2012 | Carver | ............... | G06K 9/0004 |
| | | | | 382/124 |
| 2013/0127784 A1 | 5/2013 | Martin | | |
| 2014/0064660 A1* | 3/2014 | Huang | ............... | G02B 6/0036 |
| | | | | 385/31 |
| 2015/0169163 A1* | 6/2015 | Lee | ............ | G06F 3/0486 |
| | | | | 715/769 |
| 2017/0068041 A1* | 3/2017 | Lai | ............ | G02B 6/0083 |
| 2017/0185234 A1* | 6/2017 | Zhang | ............... | G06F 3/0428 |

FOREIGN PATENT DOCUMENTS

| | | |
|---|---|---|
| KR | 1020100028458 A | 3/2010 |
| KR | 1020130046977 A | 5/2013 |
| KR | 1020130139536 A | 12/2013 |
| KR | 1020150079251 A | 7/2015 |
| KR | 1020150087802 A | 7/2015 |

* cited by examiner (a)

(b)

(a)

(b)

(a)

(b)

(a)

(b)

(a)

(b)

(c)

(a)

(b)

(c)

(a)

(b)

(c)

(a)

(b)

(a)

(b)

(a)

(b)

MOBILE TERMINAL HAVING A TOUCH REGION TO OBTAIN FINGERPRINT INFORMATION

CROSS-REFERENCE TO RELATED APPLICATIONS

Pursuant to 35 U.S.C. § 119(a), this application claims the benefit of earlier filing date and right of priority to Korean Patent Application No. 10-2015-0167359, filed on Nov. 27, 2015, the contents of which are incorporated by reference herein in their entirety.

TECHNICAL FIELD

The present disclosure relates to a mobile terminal and, more specifically, to a mobile terminal capable of recognizing a fingerprint through the glass thereof and maintaining uniform brightness.

DISCUSSION OF THE RELATED ART

As functions of terminals such as personal computers, laptop computers and cellular phones diversify, the terminals become multimedia players having multiple functions for capturing pictures or moving images, playing music, moving image files and games and receiving broadcast programs.

Terminals can be categorized as mobile terminals and stationary terminals. The mobile terminals can be further comprised of handheld terminals and vehicle mounted terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

Mobile terminal security is reinforced by introducing fingerprint recognition to mobile terminals. Particularly, a technique of recognizing a user fingerprint is mainly used. While a fingerprint sensor is provided separately from the glass of a mobile terminal in many cases, a mobile terminal having a fingerprint recognition function provided to the glass thereof can be considered for design and space utilization of the mobile terminal.

However, the thickness of the glass may increase since a fingerprint is composed of ridges and valleys and thus a sensor having a resolution less than a gap between a ridge and a valley needs to be provided to the glass.

To support and enhance this mobile terminal function, improvement of structural part and/or software part of the mobile terminal can be considered.

SUMMARY

The present disclosure provides a mobile terminal capable of recognizing a fingerprint through the glass thereof and maintaining uniform brightness.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1A:
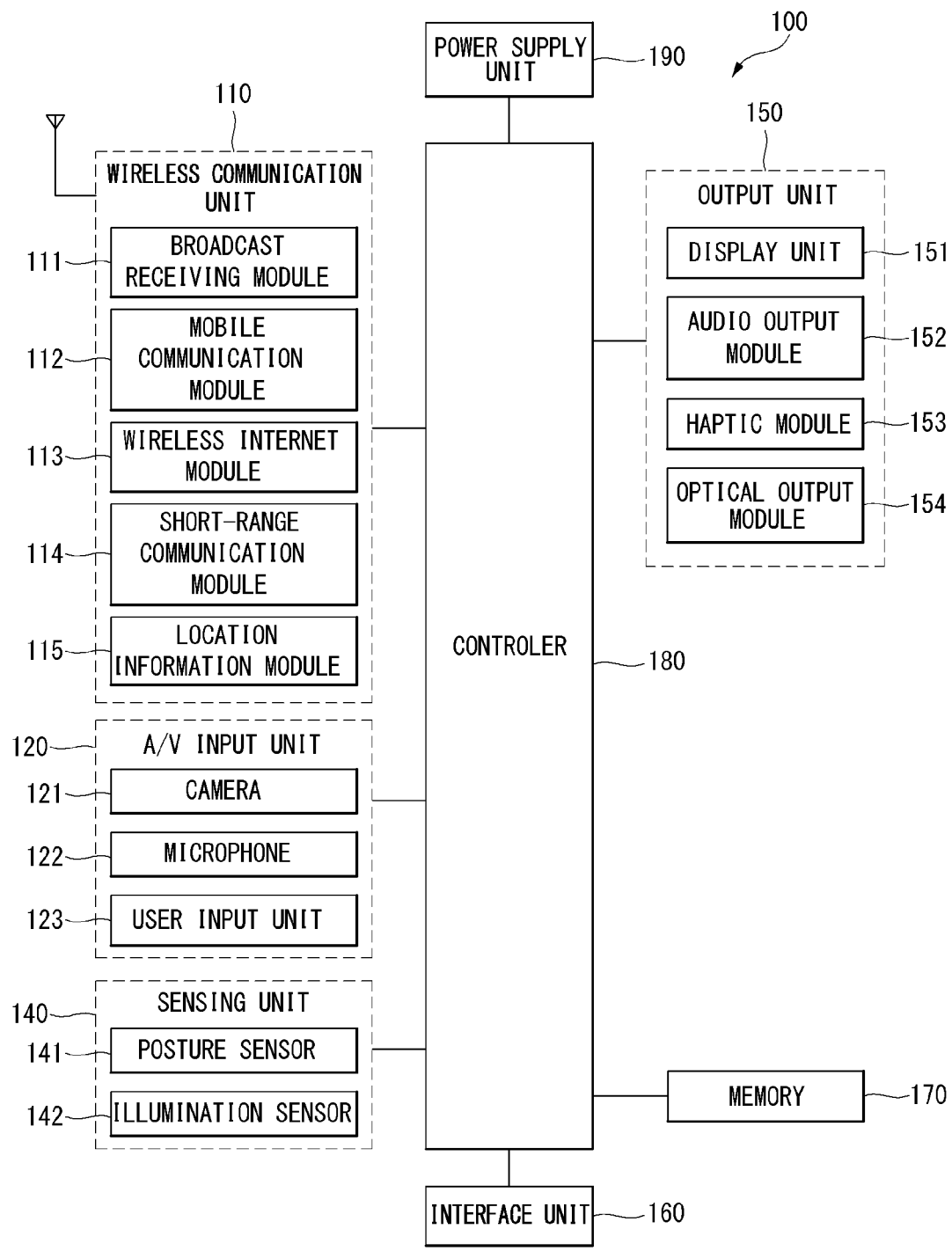
FIG. 1A is a block diagram of a mobile terminal according to an embodiment.

FIG. 1A is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1A may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 1B:
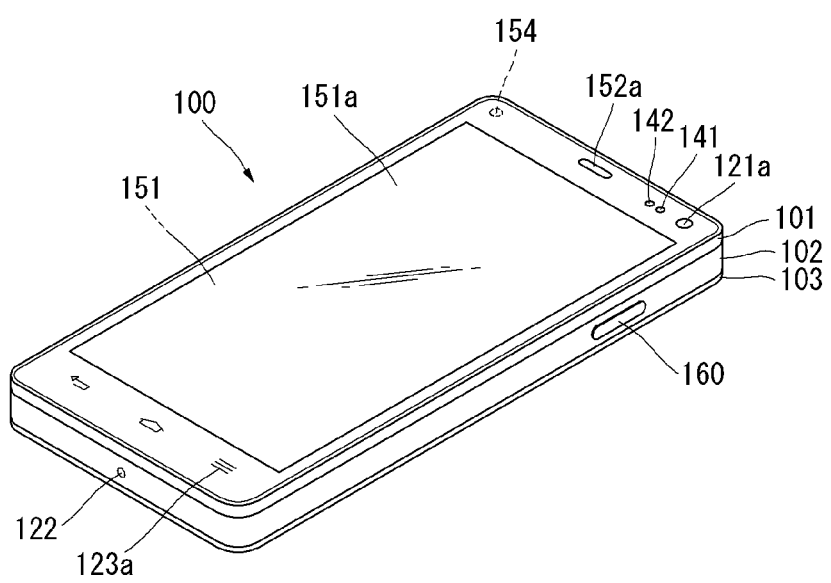
FIG. 1B is a front perspective view of the mobile terminal according to an embodiment.

FIG. 1B is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 1C:
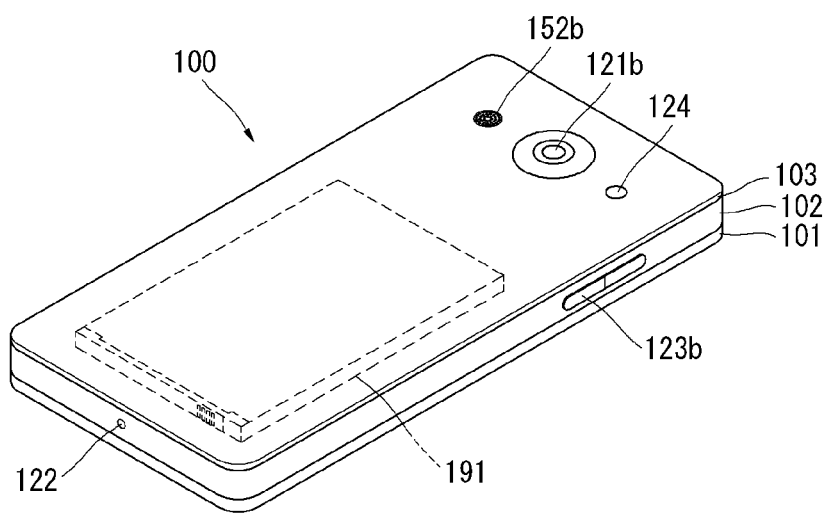
FIG. 1C is a rear perspective view of the mobile terminal according to an embodiment.

FIG. 1C is a rear perspective view of the mobile terminal (shown in FIG. 1B) according to an embodiment.

Referring to FIG. 1B, a camera 121' may be additionally attached to the rear side of the terminal body (i.e., the rear case 102). The camera 121' may have a photographing direction opposite to that of the camera 121 (shown in FIG. 1B) and may have pixels different from those of the camera 121 (shown in FIG. 1B).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 1B) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1A) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

Figure 3:
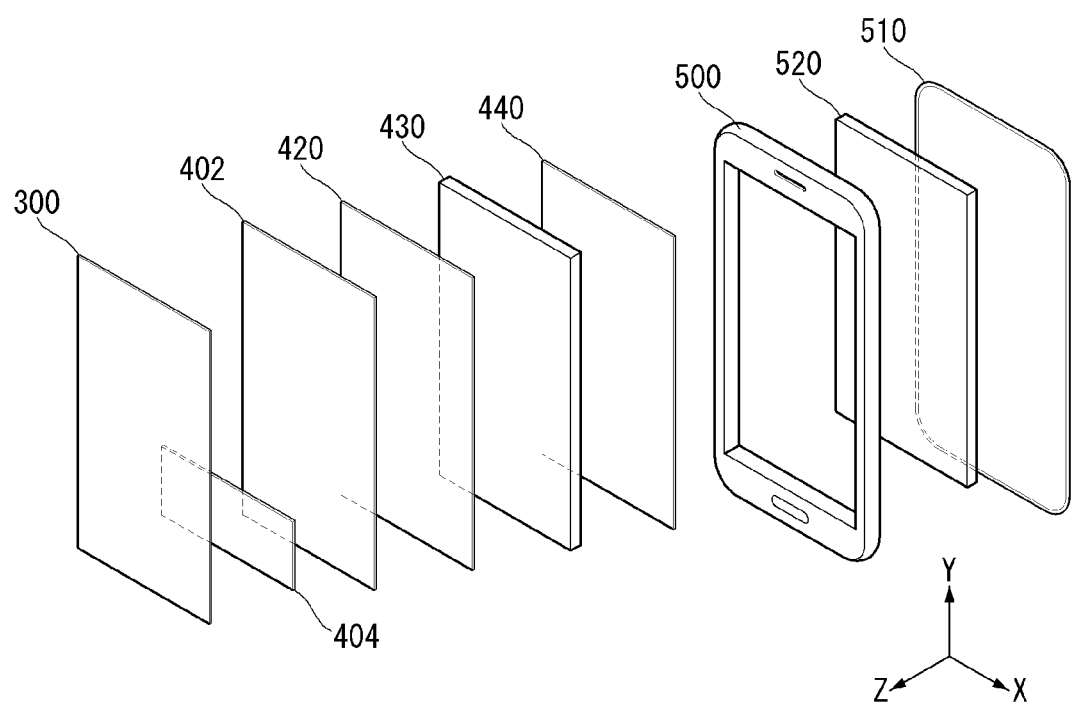
FIGS. 3 and 4 are exploded perspective views of mobile terminals according to embodiments of the present disclosure.

FIG. 3 is a view for explaining a proximity depth of a proximity sensor.

As shown in FIG. 3, when a pointer (such as a user's finger) approaches the touch screen, the proximity sensor located inside or near the touch screen may sense the approach of the pointer, and may output a proximity signal.

The proximity sensor may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

Figure 2:
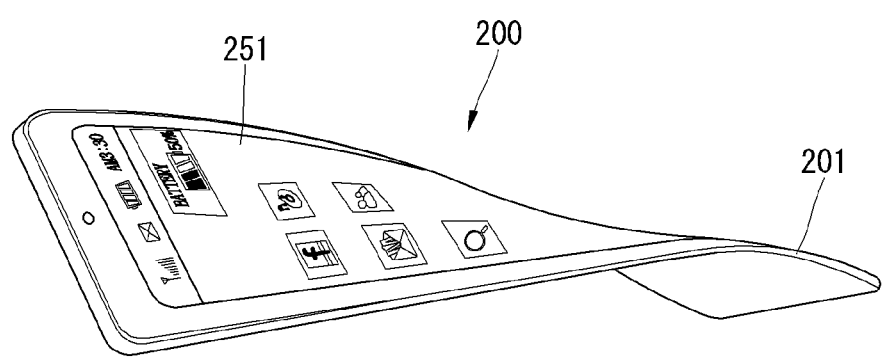
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

FIG. 3 is an exploded perspective view of a mobile terminal according to an embodiment of the present disclosure. In FIG. 3, the mobile terminal faces the front in the Z-axis direction, the Y-axis direction indicates the upper part of the mobile terminal and the X-axis direction indicates the right side of the mobile terminal.

The mobile terminal according to the present disclosure may include a glass 300, a first touch sensor 402, a second touch sensor 404, an optical sheet 420, a light guide plate 430, a reflective sheet 440, a frame 500, a back cover 510 and a PCB 520.

User touch can be applied to the first touch sensor 402 and a user fingerprint can be obtained through the second touch sensor 404.

A user fingerprint can be obtained through the second touch sensor 404 using a swipe scheme and a static/area scheme. The PCB 520 is connected to the first and second touch sensors 402 and 404 and thus touch and a fingerprint can be provided by the user to the PCB 520. As shown in FIG. 3, the first touch sensor 402 and the second touch sensor 404 may have an overlap area.

The first touch sensor 402 and the second touch sensor 404 may be separately formed, as shown in FIG. 3. When the first touch sensor 402 is separated from the second touch sensor 404, the gap between the glass 300 and the light guide plate 430 may change in the length direction (Y-axis direction) of the mobile terminal.

Figure 4:
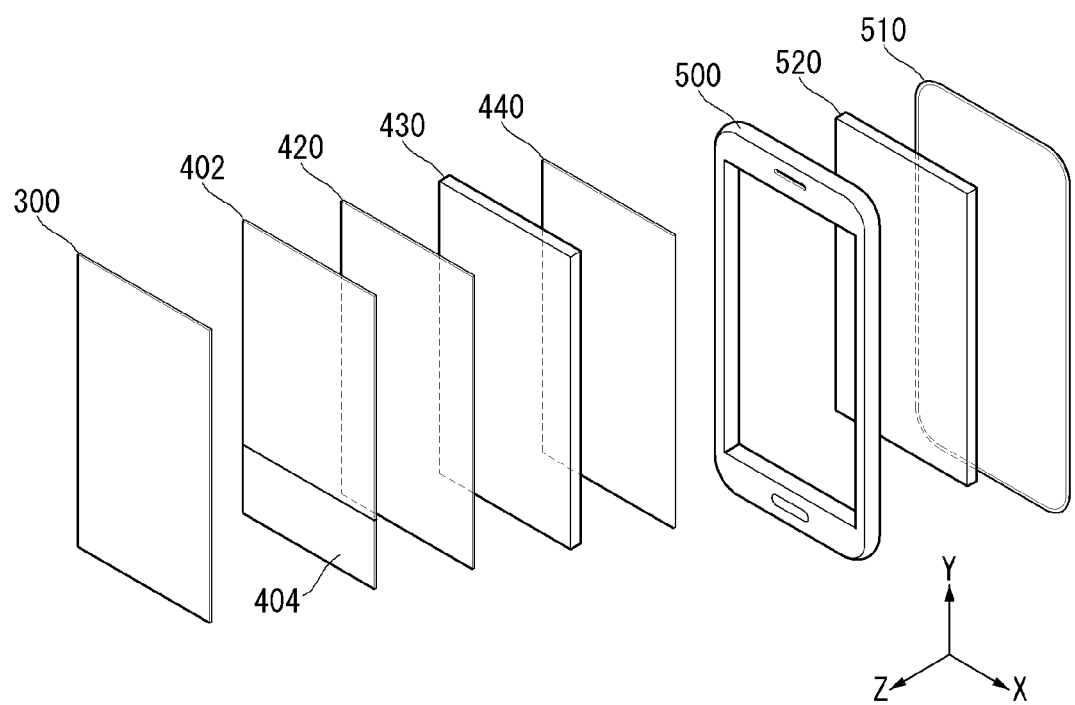

FIG. 4 is an exploded perspective view of a mobile terminal according to an embodiment of the present disclosure. The first touch sensor 402 and the second touch sensor 404 can be integrated, as shown in FIG. 4. In this case, the gap between the glass 300 and the light guide plate 430 can be uniform in the length direction (Y-axis direction) of the mobile terminal.

The glass 300 forms a screen and the light guide plate 430 receives light from a light source (not shown) and provides the light to the first and second touch sensors 402 and 404. Light having passed through the first and second touch sensors 402 and 404 is emitted to the glass 300. The optical sheet 420 can be located between the light guide plate 430 and the first and second touch sensors 402 and 404. The reflective sheet 440 can reflect light from the light guide plate 430 toward the backside of the mobile terminal (negative direction of Z-axis).

Figure 5:
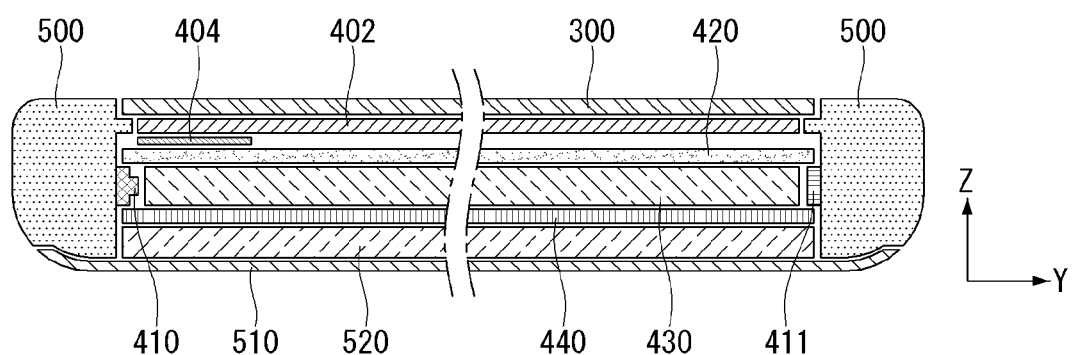
FIGS. 5 and 6 are cross-sectional views of the mobile terminals shown in FIGS. 3 and 4.
Figure 6:
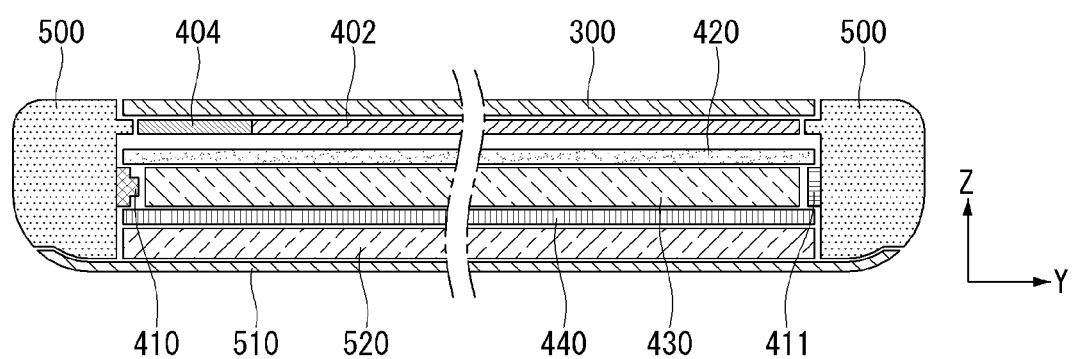

FIGS. 5 and 6 are cross-sectional views of the mobile terminals shown in FIGS. 3 and 4. The mobile may include a light source 410 providing light to the light guide plate 430 and a mirror 411 reflecting light. The light guide plate 430 does not provide light. The light guide plate 430 receives light from the light source 410. Part of the light injected into the light guide plate 430 is directly projected to the glass 300 and the remaining part of the light reaches the first and second touch sensors 402 and 404 while being reflected inside of the light guide plate 430.

Since the refractive index of the light guide plate 430 is higher than that of air, light, which is projected to the surface of the light guide plate 430 at an angle narrower than a critical angle, is total reflected and propagated inside of the light guide plate 430. In this manner, light emitted from the light source 410 is propagated. Light projected to the first and second touch sensors 402 and 404 from the light guide plate 430 will be described later.

The first touch sensor 402 and the second touch sensor 404 can be separately formed, as shown in FIG. 5. In this case, the thickness in the Z-axis direction can be varied along the Y-axis. Alternatively, the first touch sensor 402 and the second touch sensor 404 can be integrated, as shown in FIG. 6. In this case, the thickness in the Z-axis direction can be uniform in the Y-axis. Even when the first touch sensor 402 and the second touch sensor 404 are integrated and thus the thickness is uniform, as shown in FIG. 6, there may be a difference between densities of sensing electrodes constituting the first touch sensor 402 and the second touch sensor 404. Such a sensing electrode density difference may provide nonuniform light quantity to the glass 300.

Figure 7:
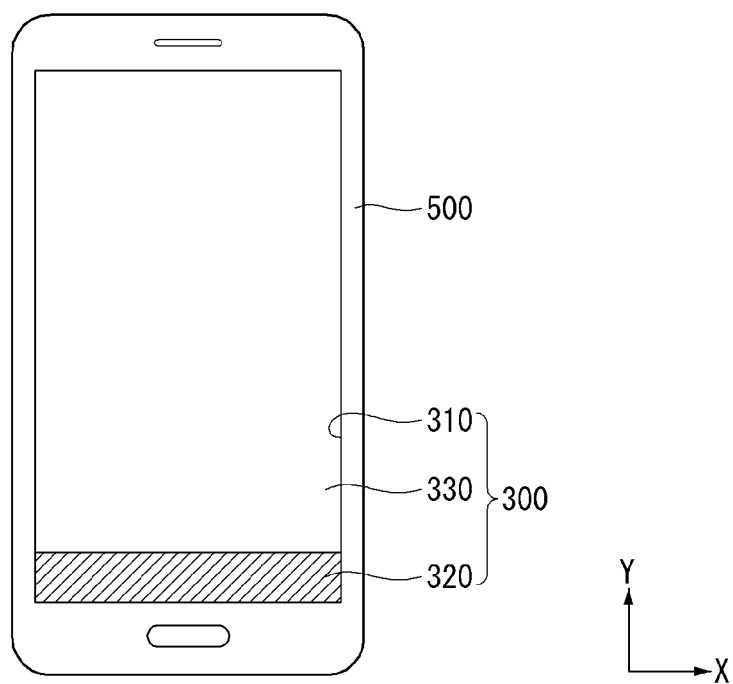
FIGS. 7 to 12 illustrate various embodiments with respect to a second touch region of the glass of the mobile terminal.

FIG. 7 illustrates a second touch region 320 located at the lower part of the glass 300. The display area 300 may include the second touch region 320 and a first touch region 330. Touch input of the user can be applied to the first touch region 330. A fingerprint of the user can be obtained through the second touch region 320.

When the second touch region 320 is located at the lower part of the display area 300. The user can conveniently manipulate the mobile terminal with one hand. Particularly, the user can conveniently manipulate the mobile terminal when a thumb of the user is registered in the mobile terminal.

Figure 8:
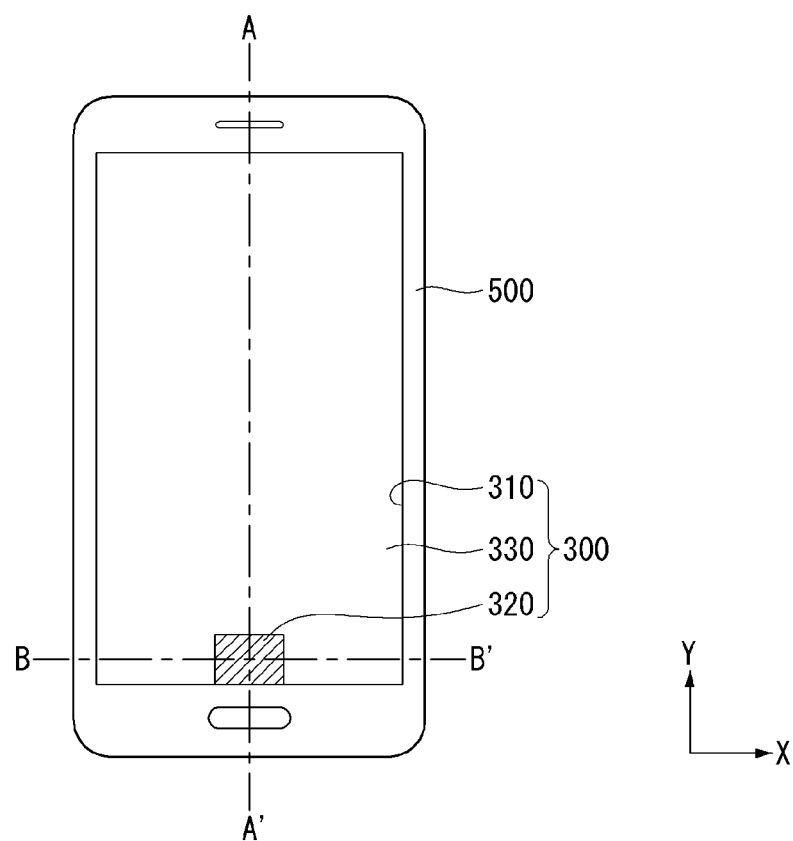

FIG. 8 illustrates the second touch region 320 located at the lower part of the glass 300 without coming into contact with the left and right edges of the glass 300.

As described above, when the second touch region 320 is provided to the lower part of the display area 300, the fingerprint of the user's thumb can be easily recognized through the second touch region 320. Particularly, since the user touches the center of the second touch region 320 when using the second touch region 320 in most cases, the user can use the fingerprint without inconvenience even when the second touch region 320 is located on the glass 30 as shown in FIG. 8. Furthermore, when the width of the second touch region 320 is reduced, the volume of the mobile terminal can be decreased.

Figure 9:
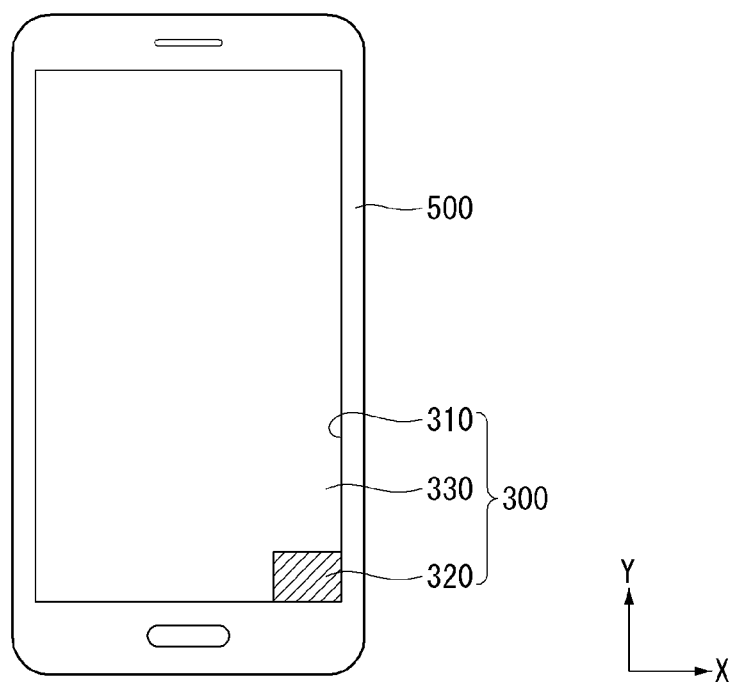

FIG. 9 illustrates the second touch region 320 located at the lower part of the glass 300, coming into contact with the right edge thereof.

When the user is a right-handed person and registers their thumb through fingerprint recognition, user convenience can be improved and technical implementation can be enhanced by locating the second touch region 320 at the lower right part of the glass 300.

The second touch region 320 may be located at the lower left part of the glass 300, which is not shown. In this case, a left-handed user can conveniently use the mobile terminal.

Figure 10:
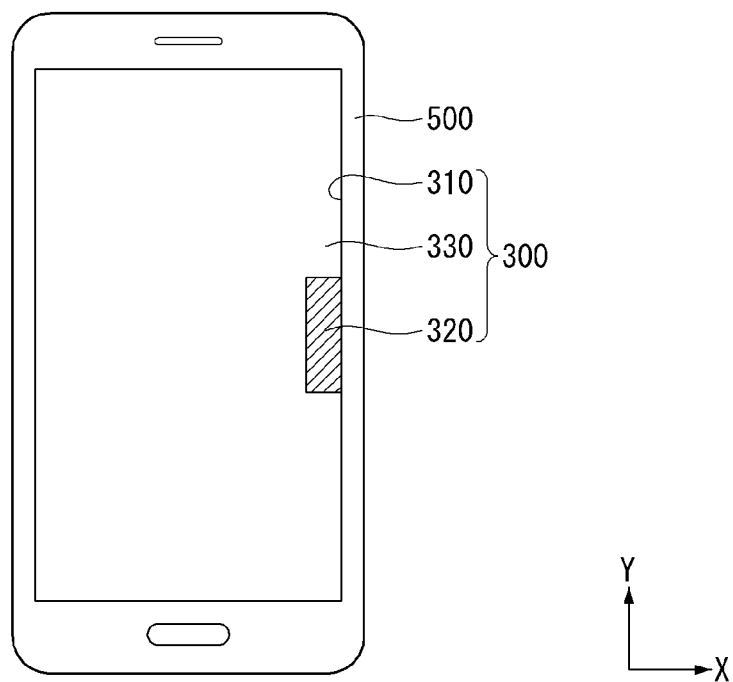
Figure 11:
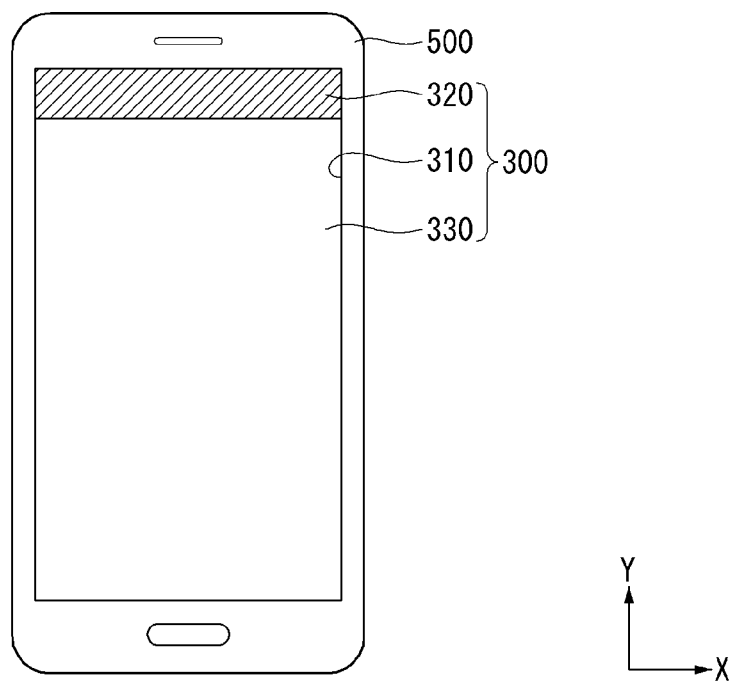

FIG. 10 illustrates the second touch region 320 located at a side edge of the glass 300 and FIG. 11 illustrates the second touch region 320 located at the upper part of the glass 300.

The second touch region 320 may occupy at least part of the glass 300, coming into contact with an edge 310 of the glass 300. Since the second touch region 320 may be thicker than the first touch region 330, it is technically possible to easily implement the second touch region 320 coming into contact with the edge 310 of the glass 300 rather than the second touch region 320 being located at the center of the glass 300.

Figure 12:
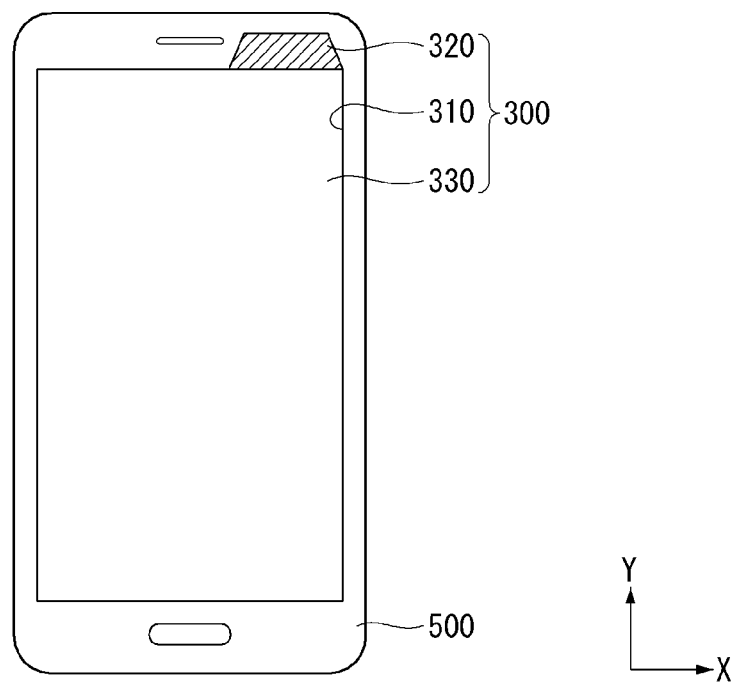

FIG. 12 illustrates the second touch region 320 provided as an independent panel 370 corresponding to a separate glass. Here, the independent panel 370 is controlled separately from the glass 300. Referring to FIG. 12, the glass 300 is a rectangular panel, whereas the independent panel 370 is a trapezoidal panel in contact with the glass 300.

Since the independent panel 370 is driven independently of the glass 300, the independent panel 370 can be maintained in an active state all the time while the glass 300 operates in the activate state and deactivated state. In this case, when the second touch region 320 is formed on the independent panel 30, the user can activate the mobile terminal while the glass 300 is in the deactivated state through fingerprint recognition using the independent panel 370.

Figure 13:
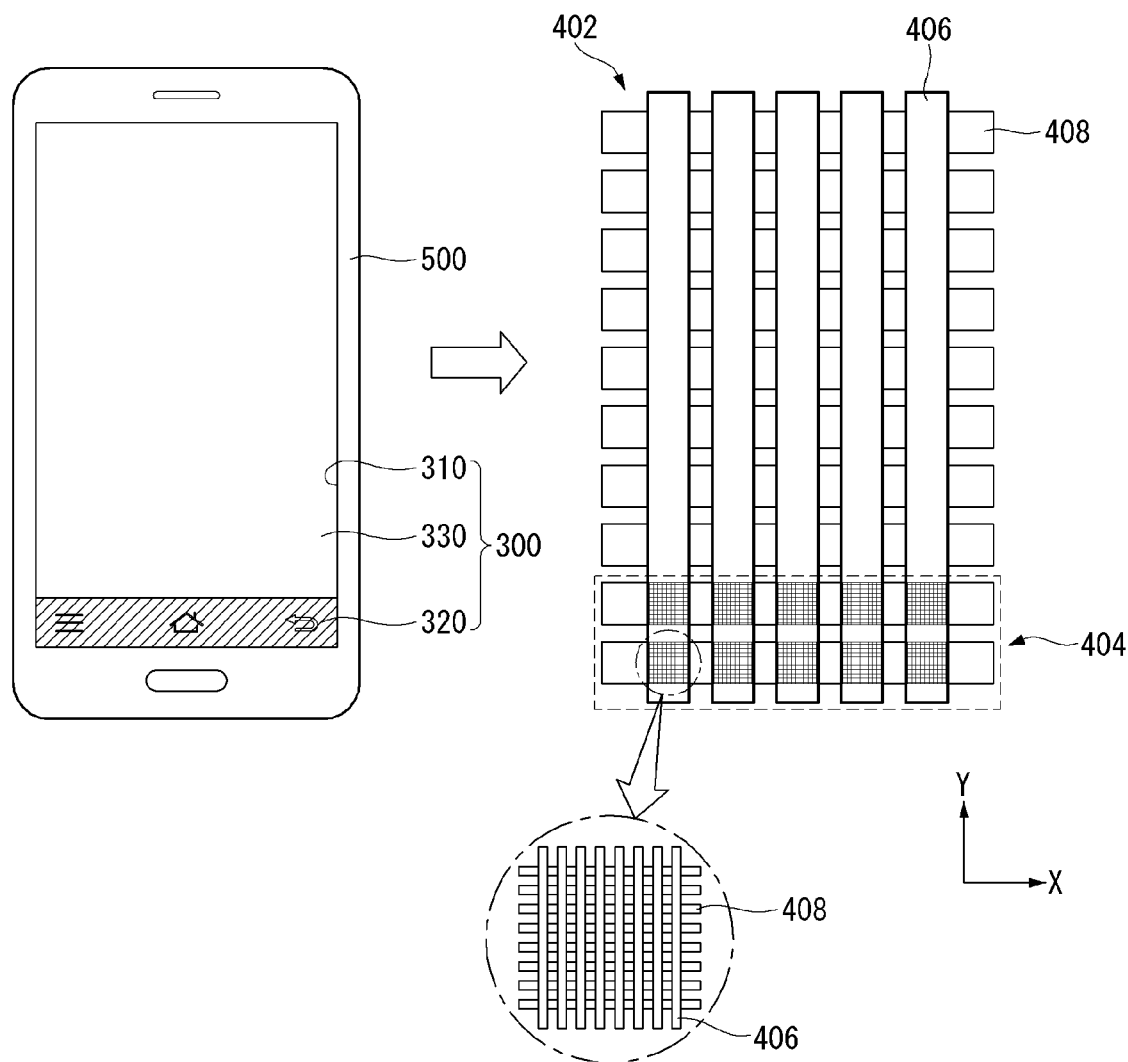
FIG. 13 illustrates structures of first and second touch sensors in the mobile terminal of FIG. 7.

FIG. 13 illustrates the first and second touch sensors of the mobile terminal shown in FIG. 7. As shown in FIG. 13, the second touch region 320 can recognize the user's fingerprint as well as user touch. Since the second touch sensor needs to have a higher resolution than the gap between a valley and a ridge of the user's fingerprint, density of transmission lines 406 and reception lines 408 in the second touch region 320, necessary for fingerprint acquisition, may need to be higher than that in the first touch region 330. The transmission lines 406 and the reception lines 408 of the first and second touch sensors 402 and 404 may have the form of a line segment as shown in FIG. 13. Here, the transmission lines 406 and the reception lines 408 can be referred to as sensing electrodes. That is, the interval between the sensing electrodes constituting the first touch sensor 402 may differ from that of the second touch sensor 404.

The first and second touch sensors 402 and 404 may sense touch using the principle that capacitance between the transmission lines 406 and the reception lines 408 varies according to whether touch is applied to the touch sensors. Since density of the sensing electrodes constituting the second touch sensor 404 may need to be higher than that of the first touch sensor 402, capacitance in the second touch sensor 404 may be higher than capacitance in the first touch sensor 402, as shown in FIG. 14(a). That is, C2 can be higher than C1. Accordingly, intensity of a driving pulse transmitted through the transmission lines 406 of the second touch sensor 404 may differ from that of the first touch sensor 402, as shown in FIG. 14(b). That is, V2 may be higher than V1.

Figure 15:
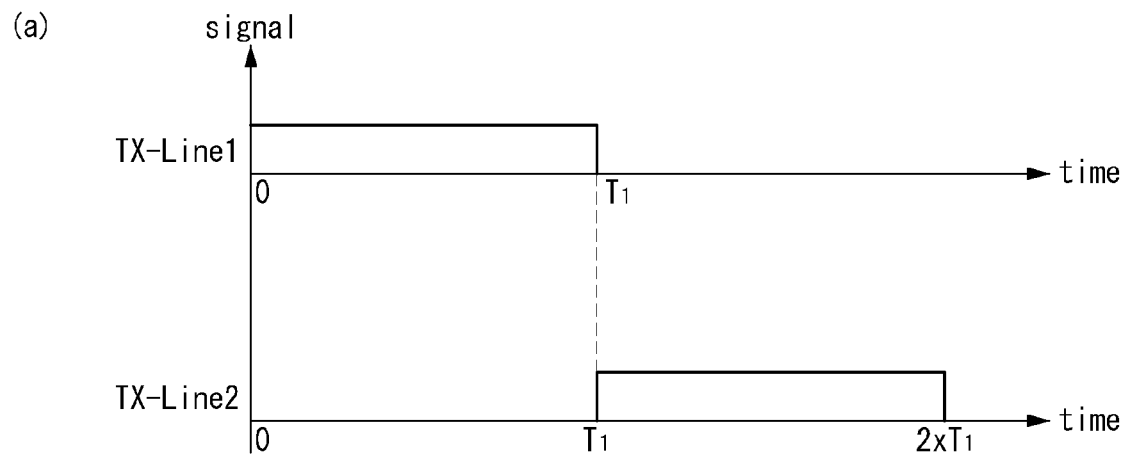
FIG. 15 illustrates signal transmission of the first and second touch sensors according to an embodiment of the present disclosure.
Figure 15:
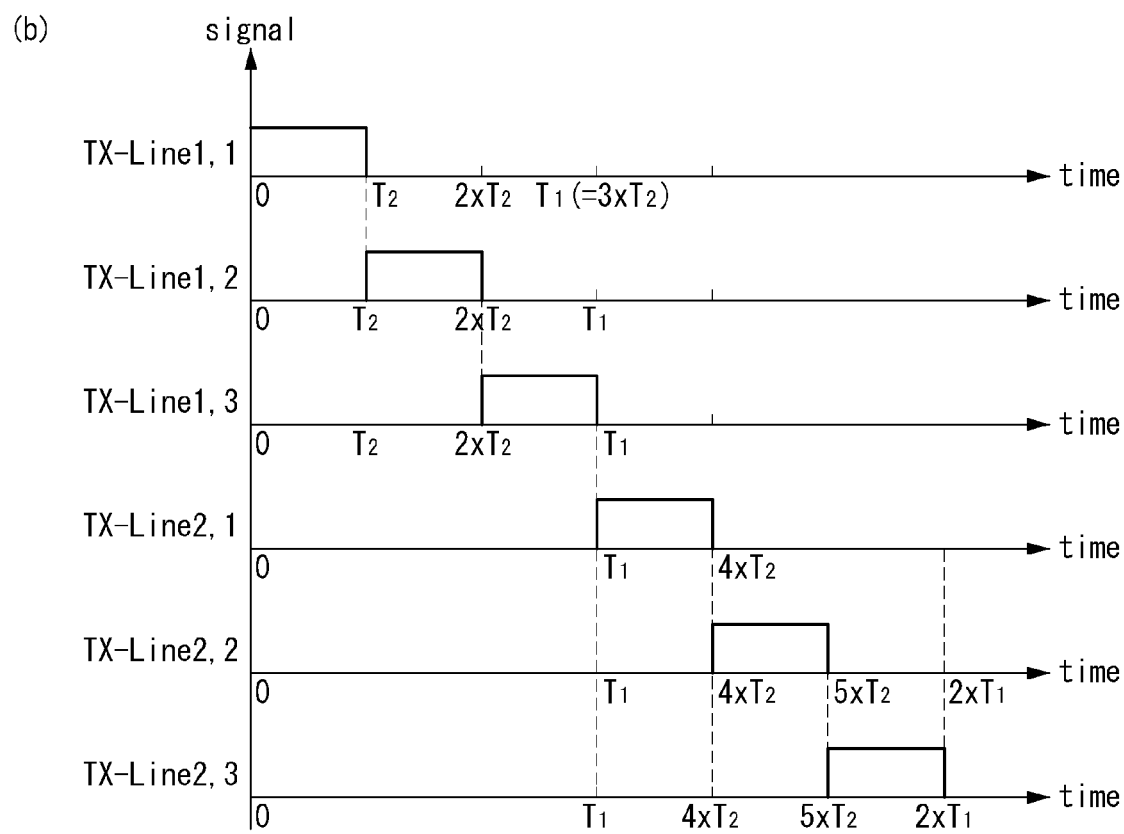

Density of the sensing electrodes constituting the second touch sensor 404 may need to be higher than that of the first touch sensor 402. Accordingly, a time interval for transmitting a signal through the transmission lines 406 of the second touch sensor 404 may be shorter than that of the first touch sensor 402, as shown in FIG. 15.

For example, density of the sensing electrodes constituting the second touch sensor 404 can be three times higher than that of the first touch sensor 402. In FIG. 15(a), Tx-line1 and Tx-line2 indicates transmission lines 406 of the first touch sensor 402. In FIG. 15(b), Tx-line1,1 to Tx-line1,3 indicate transmission lines 406 of the second touch sensor 404, which correspond to Tx-line1. Tx-line2,1 to Tx-line2,3 indicate transmission lines 406 of the second touch sensor 404, which correspond to Tx-line2. That is, the interval between the transmission lines 406 of the second touch sensor 404 can be three times shorter than the interval between the transmission lines 406 of the first touch sensor 402 in FIG. 15(b). In this case, transmission time T2 allocated to each transmission line 406 of the second touch sensor 404 in order to obtain input at the same cycle may be three times shorter than transmission time T1 allocated to each transmission line 406 of the first touch sensor 402. That is, T1 may be three times T2.

Since the second touch sensor 404 needs to transmit signals while changing signals more frequently than the first touch sensor 402, the second touch sensor 404 may consume more power than the first touch sensor 402. Accordingly, the second touch sensor 404 may advantageously be driven only when necessary.

The first touch sensor 402 has a portion corresponding to the second touch region 320, and thus the first touch sensor 402 can sense whether the user touches the second touch region 320. When user touch applied to the second touch region 320 is sensed, the second touch sensor 404 in a deactivated state can be activated.

The glass may be configured as the second touch region 320. In this case, however, the numbers of transmission lines 406 and reception lines 408 are excessively large and thus the volume of the mobile terminal may increase. Accordingly, provision of separate transmission lines and reception lines corresponding to the second touch region 320 may be considered.

The first touch sensor 402 may be formed by arranging transmission lines 406 and reception lines 408 such that the transmission lines 406 and the reception lines 408 correspond to the first touch region 330, and the second touch sensor 404 may be formed by arranging separate transmission lines 406 and reception lines 408 such that the transmission lines 406 and the reception lines 408 correspond to the second touch region 320.

Figure 16:
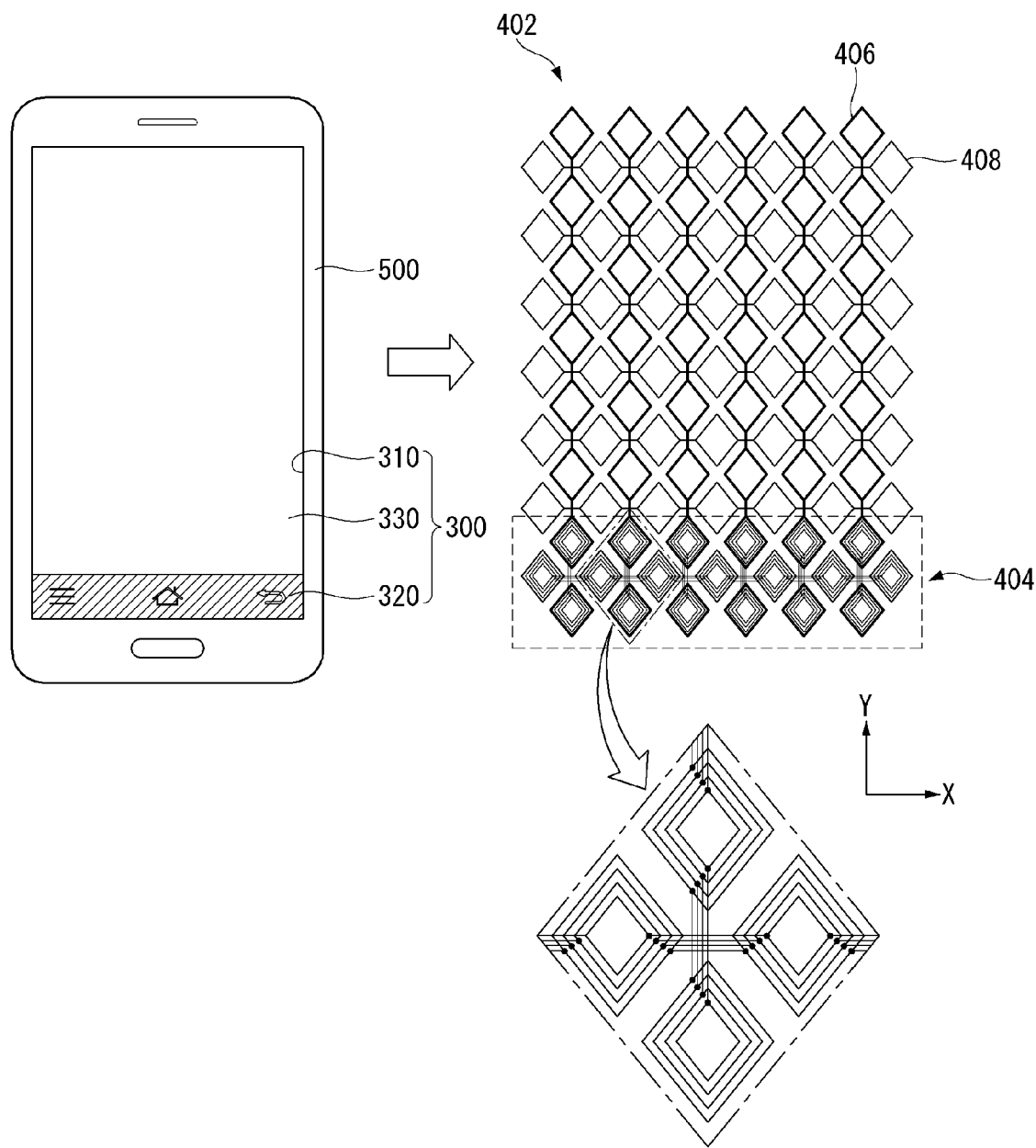
FIG. 16 illustrates sensing electrode configurations of the first and second touch sensors according to an embodiment of the present disclosure.

The transmission lines 406 and the reception lines 408 constituting the first touch sensor 402 and the second touch sensor 404 may be formed in a diamond pattern, as shown in FIG. 16.

For example, the first touch sensor 402 can correspond to the first touch region 330 and have 12 transmission lines 406 and 9 reception lines 408, as shown in FIG. 16. Here, the transmission lines 406 and the reception lines 408 can be formed in a diamond pattern.

The second touch sensor 404 may be integrated with the first touch sensor 402. For example, as shown in FIG. 16, the second touch sensor 404 can be integrated with the first touch sensor 402 by forming a plurality of transmission lines 406 or reception lines 408 inside of each diamond pattern of the first touch sensor 402.

Figure 17:
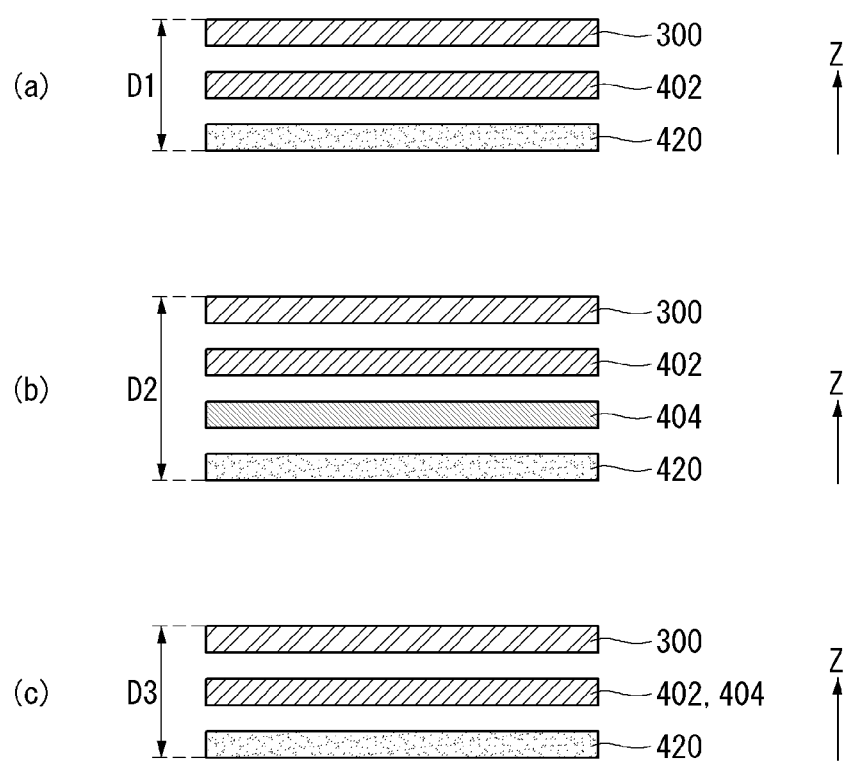
FIG. 17 illustrates a laminated structure of the mobile terminal according to an embodiment of the present disclosure.

FIG. 17(a) shows the cross section of the glass 300, the first touch sensor 402 and the optical sheet 420 corresponding to a portion of the first touch region 330 outside of the second touch region 320 of the mobile terminal shown in FIG. 3 in the thickness direction (Z-axis direction) and FIG. 17(b) shows the cross section of the glass 300, the first and second touch sensors 402 and 404 and the optical sheet 420 corresponding to the second touch region 320 of the mobile terminal shown in FIG. 3 in the thickness direction (Z-axis direction). FIG. 17(c) shows the cross section of the glass 300, the first and second touch sensors 402 and 404 and the optical sheet 420 corresponding to the second touch region 320 of the mobile terminal shown in FIG. 4 in the thickness direction (Z-axis direction).

A portion of the first touch region 330, outside of the second touch region 320, includes the glass 300, the first touch sensor 402 and the optical sheet 420 which are laminated. When the first touch sensor 402 and the second touch sensor are separately formed, the second touch region 320 includes the glass 300, the first touch sensor 402, the second touch sensor 404 and the optical sheet 420, which are laminated, as shown in FIG. 17(b). When the first touch sensor 402 and the second touch sensor 404 are integrated, the second touch region 320 includes the glass 300, the first touch sensor 402 and the optical sheet 420, which are laminated, as shown in FIG. 17(c).

When the first touch sensor 402 and the second touch sensor 404 are separately formed, as shown in FIGS. 17(a) and 17(b), the thickness of the portion of the first touch region 300 outside of the second touch region 320 is D1 and the thickness of the second touch region 320 is D2, D2 may be greater than D1 due to the thickness of the second touch sensor 404. Accordingly, the thickness of the light guide plate in the Z-axis direction may not be uniform. In this case, if a conventional light guide plate based on uniform thickness in the Z-axis direction is used, the portion of the light guide plate, which corresponds to the second touch region 320, may be thicker than the other portion and thus the second touch region 320 may be darker than the other region.

When the first touch sensor 402 and the second touch sensor 404 are integrated, as shown in FIG. 17(c), the thickness of the first touch region 330 and the thickness of the second touch region 320 are identical as D3. However, density of the first touch sensor 402 corresponding to the portion of the first touch region 330 outside of the second touch region 430 may be lower than density of the first and second touch sensors 402 and 404 corresponding to the second touch region 320. Accordingly, when the conventional light guide plate is used, the second touch region may be darker than the other region.

Figure 18:
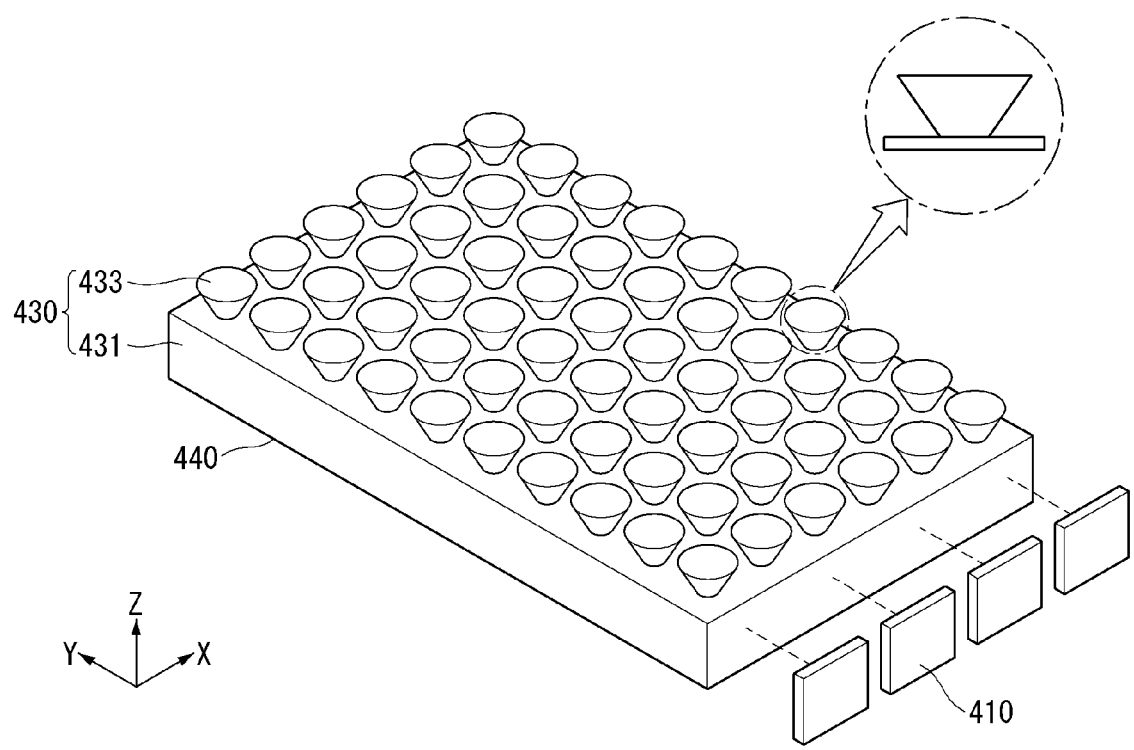
FIGS. 18 to 21 illustrate light guide plate structures according to various embodiments of the present disclosure.

The light guide plate 430 shown in FIG. 18 may include a light guide plate body 431 and windows 433. The light source 410 may be located at one side of the light guide plate body 431 to provide light to the light guide plate body 431. The light guide plate body 431 may have a shape corresponding to the glass. The light guide plate body 431 can receive light from the light source 410 and propagate the light while reflecting the same.

Since the refractive index of the light guide plate body 431 is higher than that of air, at least part of light propagated inside of the light guide plate 431 can be total reflected.

Figure 19:
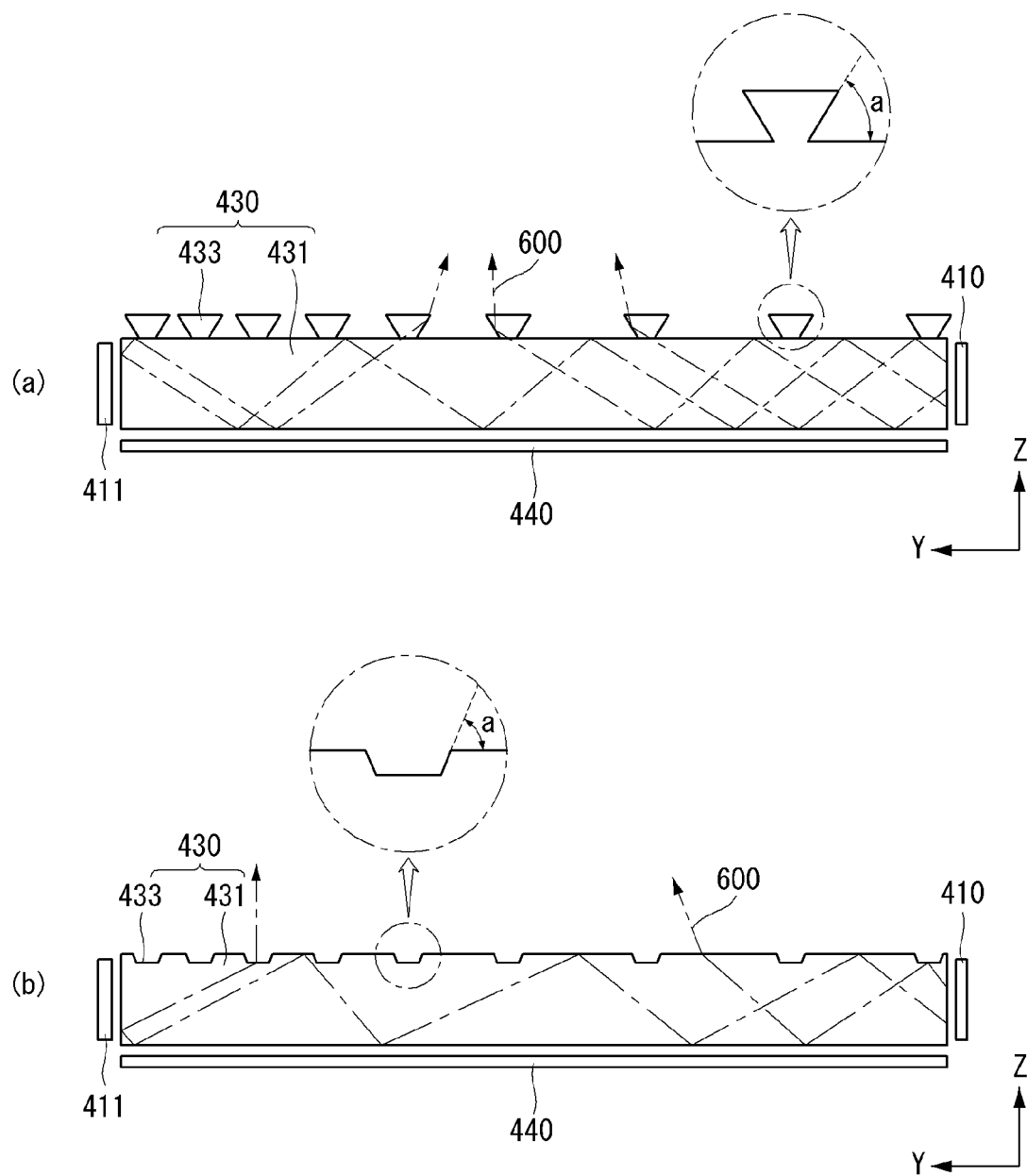

The windows 433 can be formed on the side of the light guide plate 431, which faces the glass. The windows 433 may have a protrusion shape protruding from the surface of the light guide plate body 431, as shown in FIG. 19(a), or a hole shape recessed from the surface of the light guide plate body 431, as shown in FIG. 19(b). Alternatively, the windows 433 may be configured as a combination of protrusions and holes, which is not shown.

Each window 433 may have a wall extended from the surface of the light guide plate body 431 to the glass, as shown in FIG. 19(a). The angle between the surface of the light guide plate body 431 and the wall can be "a". When the angle "a" is a right angle, the window 433 can take a pillar shape. When the cross section of the window 433 is a circle, the window 433 can have a cylindrical shape. When the angle "a" is an obtuse angle and the cross section of the window 433 is a circle, the window 433 can have a truncated cone shape. When the angle "a" is an acute angle and the cross section of the window 433 is a circle, the window 433 can have an inverted truncated cone shape, as shown in FIG. 19(a). Since the refractive index of the window 433 may be the same as the light guide plate body 431, the quantity of light emitted from the window 433 may be determined by the angle "a".

Each window 433 may have the shape of a hole recessed from the surface of the light guide plate body 431, as shown in FIG. 19(b). The window 433 can have a wall extended from the surface of the light guide plate body 431 to the inside thereof. The angle between the surface of the light guide plate body 431 and the wall can be "a". Since the refractive index of the window 433 may be the same as the light guide plate body 431, the quantity of light emitted from the window 433 may be determined by the angle "a".

When the window 433 has a hole shape, the angle "a" between the wall of the window 433 and the surface of the light guide plate body 431 may be changed according to position. For example, the angle "a" can be an obtuse angle in the case of a wall close to the light source 410, whereas the angle "a" can be an acute angle in the case of a wall at a distance from the light source 410. It is possible to control the quantity of light provided to the glass on the basis of distance from the light source 410 by changing the angle "a" according to position.

When light propagated inside of the light guide plate body 431 reaches the windows 433, the light has an injection angle different from that at the surface of the light guide plate body 431 and thus the light can pass through the windows 433 without being total reflected. The light that has passed through the windows 433 can be propagated to the glass.

Figure 20:
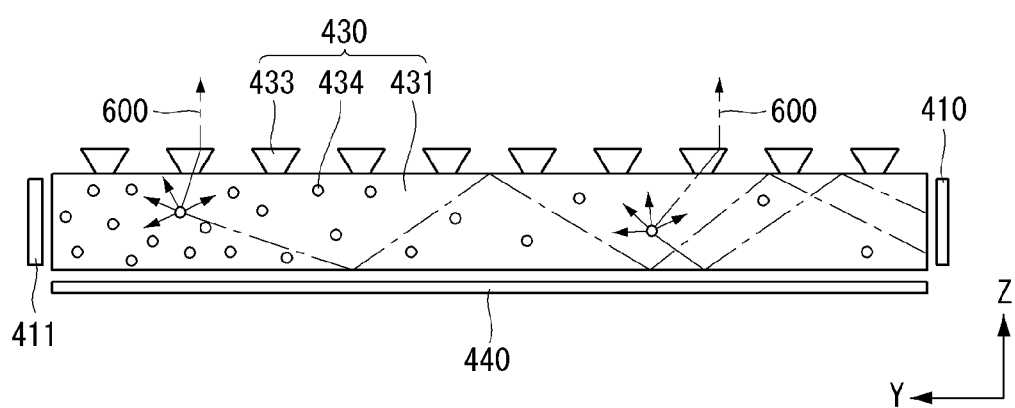

FIG. 20 illustrates a light guide plate structure according to an embodiment of the present invention. The light guide plate 430 may include light diffusing particles 434 contained in the light guide plate body 431. When visible light is projected to the light diffusing particles 434, the light diffusing particles 434 can reflect the visible light in a plurality of directions.

A plurality of light diffusing particles 434 may be provided. The light diffusing particles 434 may be a polymer, particularly, polystyrene.

The light diffusing particles 434 may have a uniform or nonuniform distribution inside of the light guide plate body 431. The light guide plate 430 may include the windows 433 provided on the side thereof, which faces the glass 300, as shown in FIG. 20. A plurality of windows 433 may be uniformly distributed on the light guide plate 430.

Spatial density of the light diffusing particles 434 may be varied in the Y-axis direction. When the windows 433 are uniformly distributed, the quantity of light provided from the light guide plate 434 to the glass 300 can be controlled to be uniform by adjusting spatial density of the light diffusing particles 434. Even if the windows 433 are uniformly distributed, the quantity of light provided from the light guide plate 434 to the glass 300 can be controlled by adjusting spatial density of the light diffusing particles 434.

Figure 21:
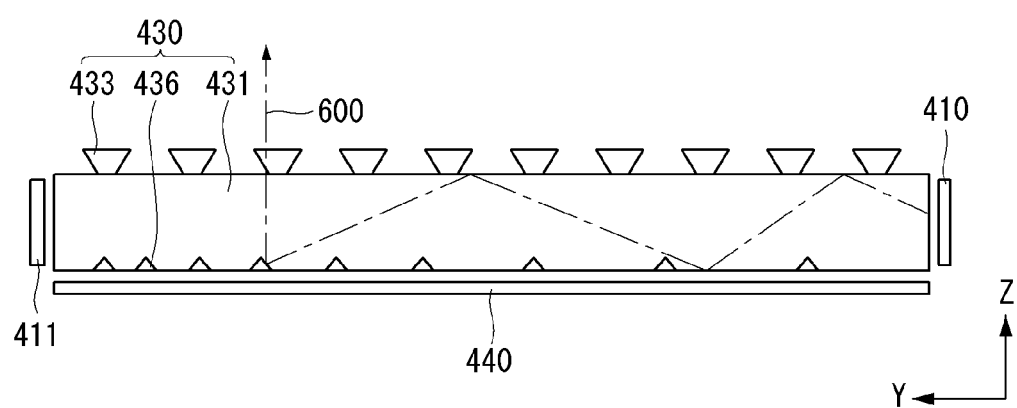

FIG. 21 illustrates a light guide plate structure according to an embodiment of the present invention. The light guide plate 430 may include a lower pattern 436 formed on one side of the light guide plate body 431, which faces the reflective sheet 440.

The lower pattern 436 may be formed on the external surface of the light guide plate body 431 or inside of the light guide plate body 431.

The lower pattern 436 may have a conic shape, as shown in FIG. 21. Alternatively, the lower pattern 436 may have the form of a pillar in parallel with the X-axis. The cross section of the pillar may be a triangle, rectangle, trapezoid, circle or oval. A reflection pattern of light incident upon the lower pattern 436 may depend on the shape of the lower pattern 436.

Spatial density of the lower pattern 436 may be uniform or nonuniform in the Y-axis direction. Spatial distribution of the quantity of light provided to the glass 300 may depend on spatial density of the lower pattern 436.

The quantity of light provided from the light guide plate 430 to the glass 300 may be controlled to be uniform by adjusting spatial density of the lower pattern 436. Even if the windows 433 are not uniformly distributed, it is possible to control the quantity of light provided from the light guide plate 430 to the glass 300 by adjusting spatial density of the lower pattern 436.

The windows 433 may all have the same shape, and density of the windows 433 may be varied according to distance from the light source, as shown in FIG. 22(a). In the case of a mobile terminal having no fingerprint recognition function, a structure in which the glass and a touch sensor are laminated may have a uniform thickness. In this case, however, brightness of light provided to the glass may decrease according to distance (distance on the Y-axis) from the light source. Accordingly, to compensate for brightness decrease, density of the windows 433 can be increased as the distance from the light source increases.

As shown in FIG. 22(b), which represents FIG. 22(a) as a graph, spatial density of the windows 433 can be increased according to distance on the Y-axis.

Figure 23:
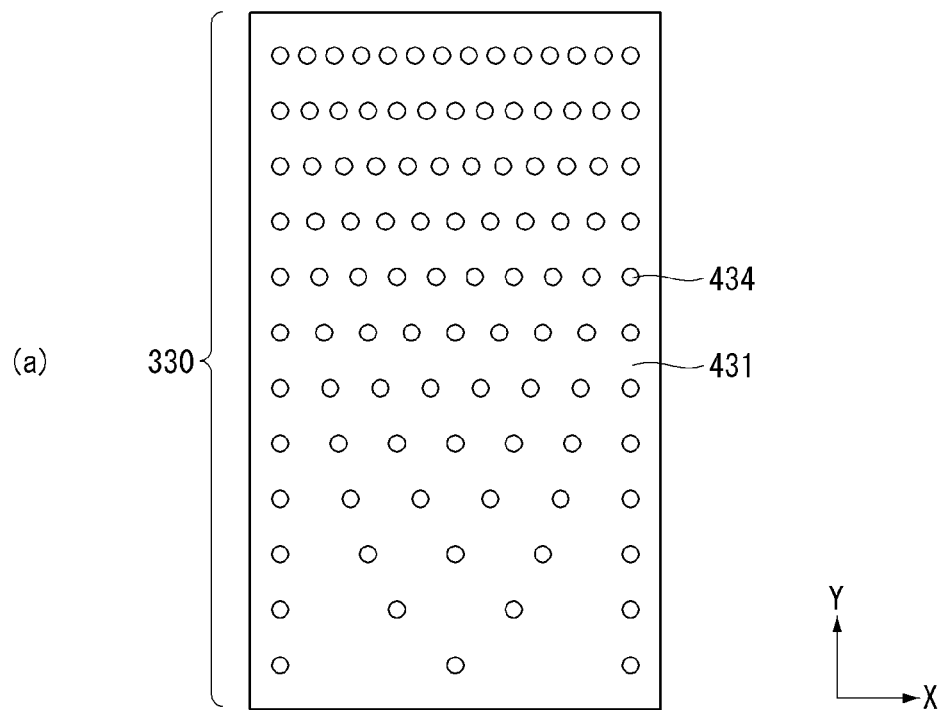
Figure 23:
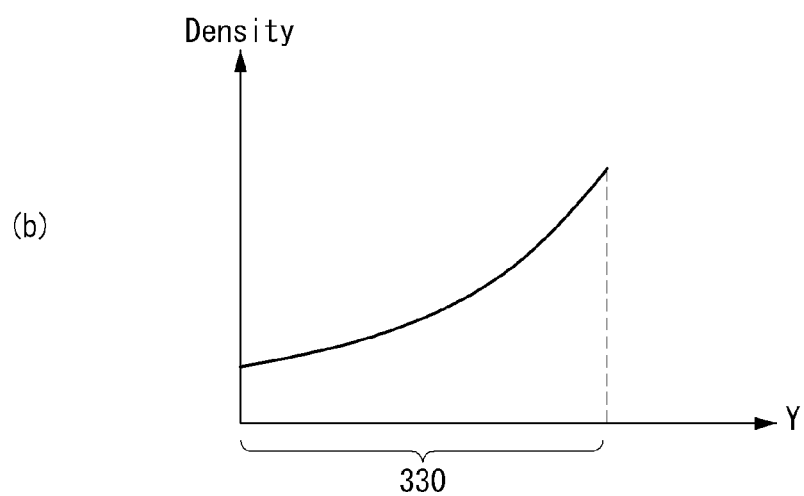

In the case of the light guide plate 430 including the light diffusing particles 434, the light diffusing particles 434 may be distributed, as shown in FIG. 23(a).

The light diffusing particles 434 can be uniformly distributed on one side of the light guide plate body 431. Even if the light diffusing particles 434 are not uniformly distributed, brightness of light provided to the glass can be controlled to be uniform by adjusting spatial density of the light diffusing particles 434.

Figure 24:
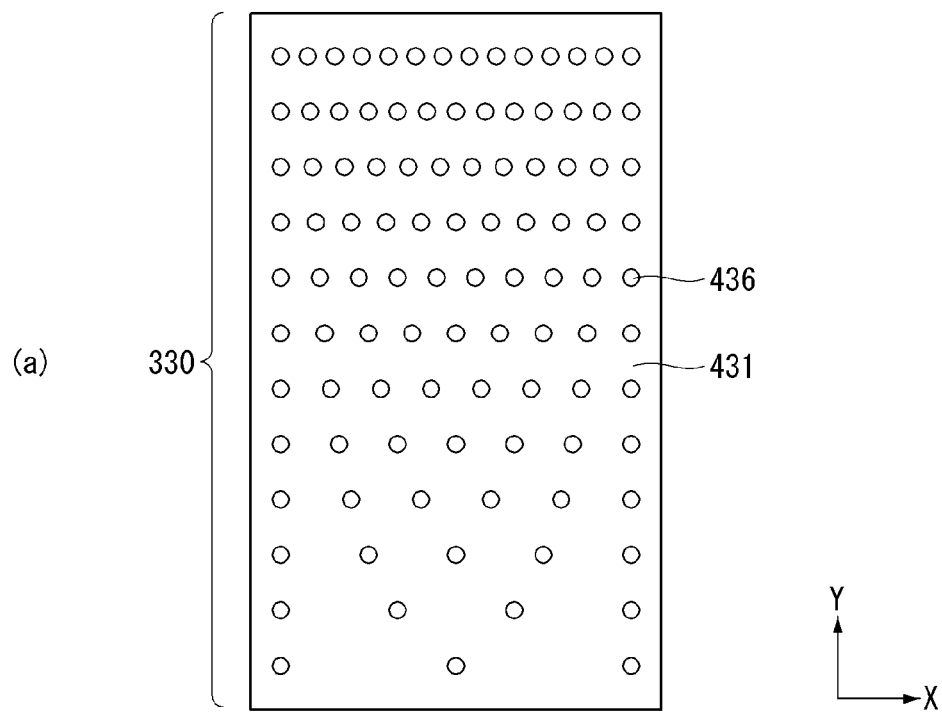
Figure 24:
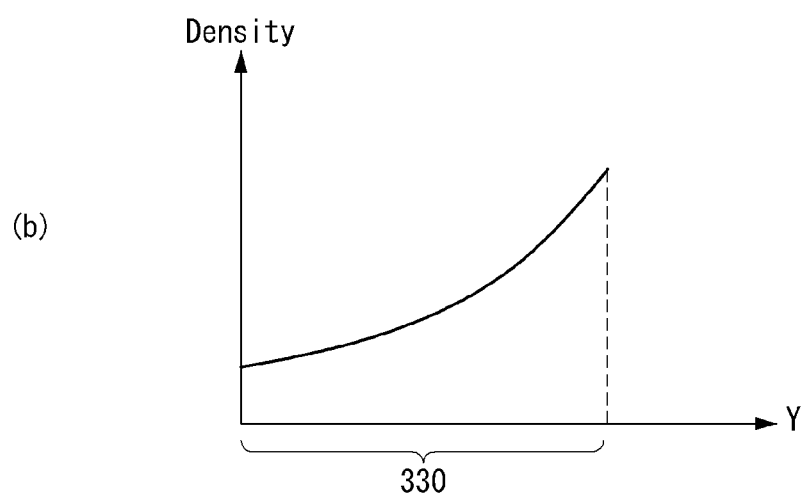

Spatial density of the optical diffusing particles 434 may be varied according to distance in the Y-axis direction, as shown in FIG. 23(b). Spatial density of the light diffusing particles 434 may increase as the distance in the Y-axis direction increases. In the case of the light guide plate 430 including the lower pattern 436, the lower pattern 436 can be distributed as shown in FIG. 24(a). It is possible to control brightness of light provided to the glass by adjusting spatial density of the lower pattern 436. The lower pattern 436 may have a conic shape, a truncated conic shape or a faceted conic shape.

Spatial density of the lower pattern 436 may be varied according to distance in the Y-axis direction, as shown in FIG. 24(b). Spatial density of the lower pattern 436 may increase as the distance in the Y-axis direction increases.

Figure 14:
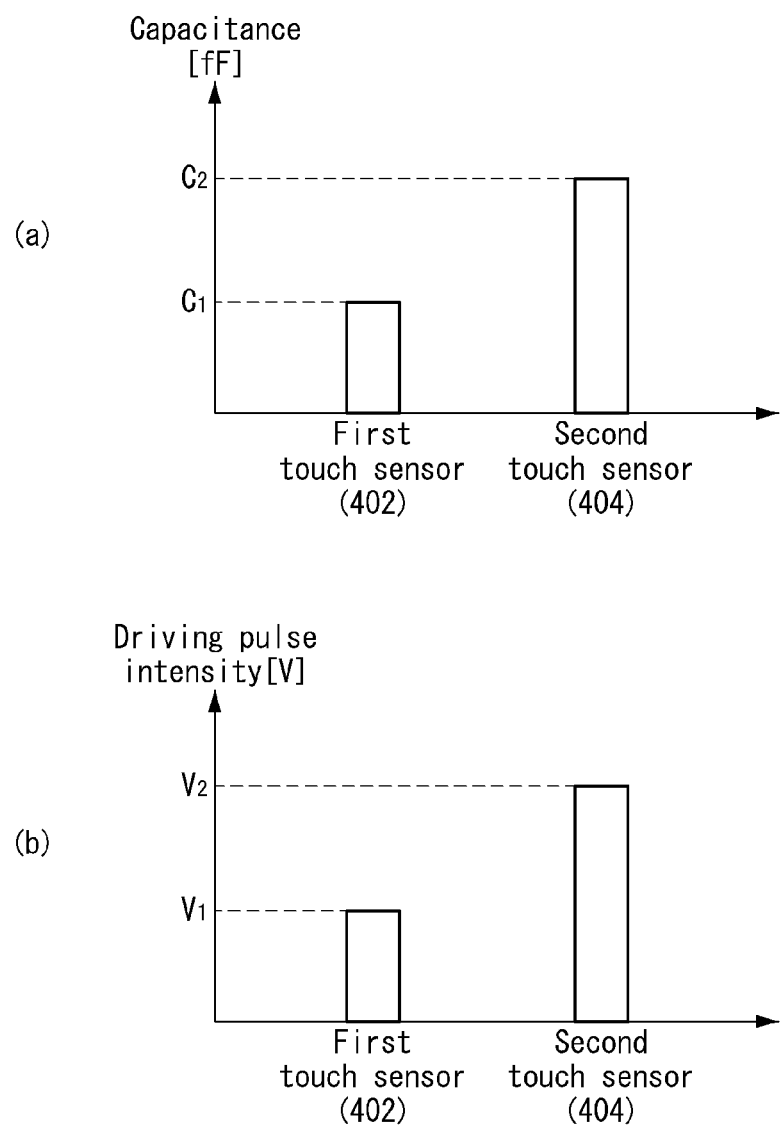
FIG. 14 illustrates capacitance and driving pulse signals of the first and second touch sensors according to an embodiment of the present disclosure.

Spatial density of the lower pattern 436 may be varied in the X-axis direction, which is not shown in FIG. 14. When the lower pattern 436 has the shape of a pillar in contact with one side of the light guide plate body 431, the lower pattern 436 can be arranged such that components of the lower pattern 436 are in a line or not in the length direction.

Figure 25:
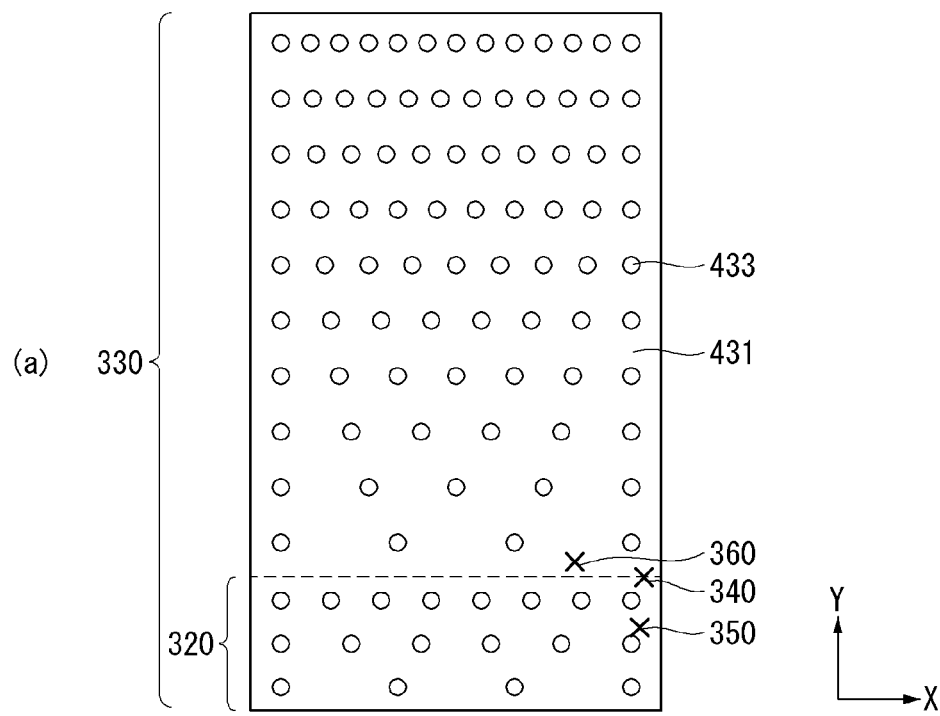
FIG. 25 illustrates spatial density of a window in the mobile terminal of FIG. 7.
Figure 25:
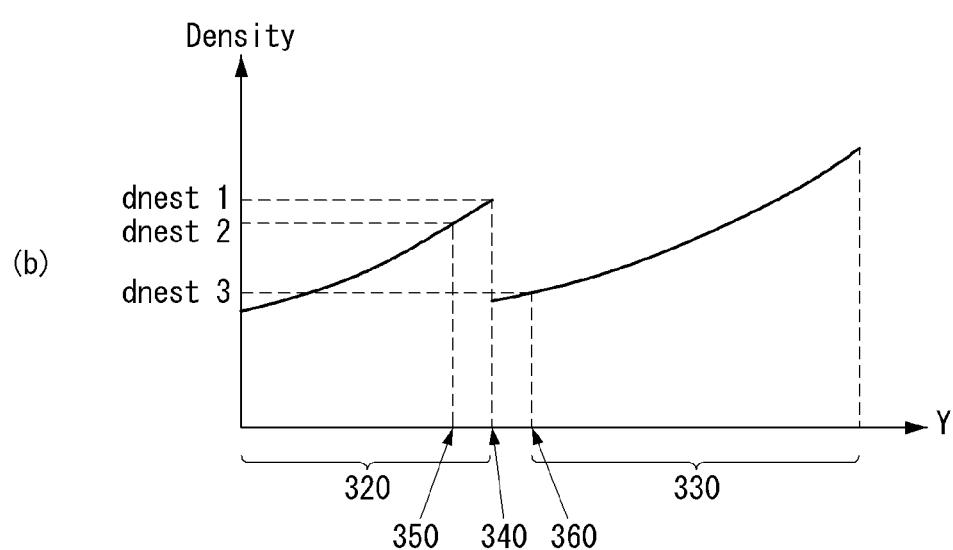

FIG. 25 illustrates spatial density of the windows of the mobile terminal shown in FIG. 7. In FIG. 25, the second touch region 320 is located at the lower part of the glass. The windows 433 may have the same shape. Brightness of light passing through the glass can be uniform by controlling brightness of light provided from a region of the light guide plate 430, which corresponds to the second touch region 320, to be higher than brightness of light provided from a region of the light guide plate 430, which corresponds to the first touch region 330.

Figure 22:
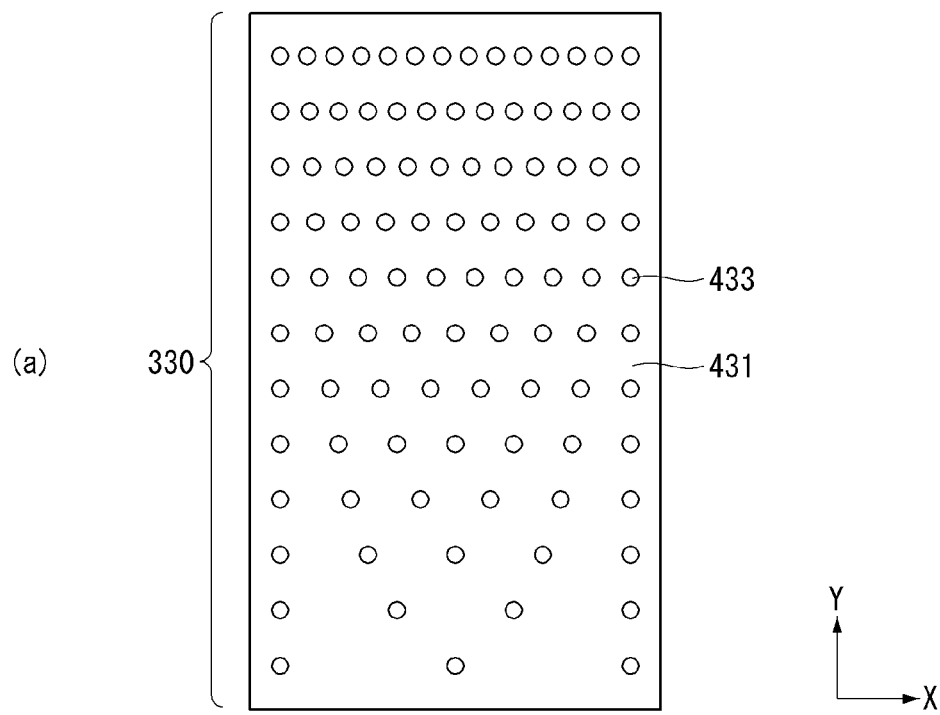
FIGS. 22 to 24 illustrate a mobile terminal light guide plate having no fingerprint recognition function.
Figure 22:
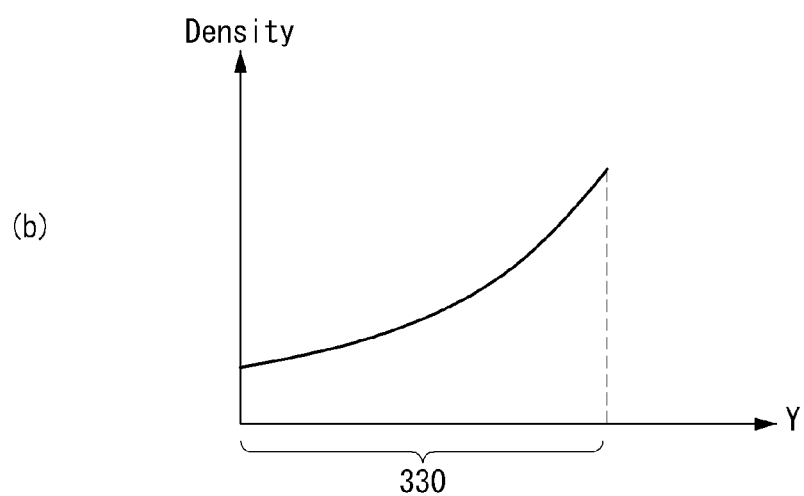

Since the thicknesses of the first and second touch sensors are not uniform or density of the first and second touch sensors is not uniform in the direction in which the light guide plate faces the glass, as described above, the distribution pattern of the windows 433 may differ from the window distribution pattern shown in FIG. 22. As shown in FIG. 25(a), spatial density of the windows 433 formed on the light guide plate body 431 corresponding to the second touch region 320 in the light guide plate 430 can increase as the distance from the light source increases (in the Y-axis direction).

The thickness of the first and second touch sensors may be discontinuously varied or density of the first and second touch sensors may be discontinuously varied in the direction in which the light guide 430 faces the glass 300 at the boundary of the second touch region 320 along the Y-axis. That is, brightness of light provided to the glass may be discontinuous at a portion of the light guide plate 430 corresponding to the boundary of the second touch region 320. Since brightness of light provided to the glass may depend on the density of the windows 433, the density of the windows 433 can be discontinuously varied at the portion of the light guide plate 430 corresponding to the boundary of the second touch region 320.

Here, the concept of a specific transparent hole area is introduced. The specific transparent hole area can be defined as the area of windows 433 per unit area of the light guide plate 430 at a portion of the light guide plate 430. The specific transparent hole area can depend on the size and density of the windows 433. As a method for changing the specific transparent hole area, it is possible to consider a method for varying the density of the windows 433 while maintaining the shape of the windows 433, a method for varying the size of the windows 433 while maintaining the density of the windows 433 and a method for simultaneously varying the density and size of the windows 433.

When the windows 433 have the same shape, as shown in FIG. 25, the density of the windows 433 can correspond to the specific transparent hole area of the windows 433. Accordingly, the specific transparent hole area can increase as the distance from the light source increases and can be discontinuously varied at a portion of the light guide plate 430, which correspond to the boundary of the second touch region 320 and the first touch region 330, as shown in FIG. 25(a).

The density of the windows 433 or the specific transparent hole area at the boundary of the second touch region 320 is considered. A point of the boundary of the second touch region 320, which corresponds to the first touch region 330, may be referred to as a first point 340, a point of the second touch region 320, adjacent to the first point, may be referred to as a second point 350, and a point of the first touch region 330, which is adjacent to the first point and corresponds to a point outside of the second touch region 320, may be referred to as a third point 360.

As shown in FIGS. 25(a) and 25(b), density dnst2 of the windows 433 at the second point 350 may be higher than density dnst3 of the windows 433 at the third point 360. From the viewpoint of the specific transparent hole area, a specific transparent hole area at the second point 350 may be wider than a specific transparent hole area at the third point 360.

The window distribution pattern in FIG. 25(b) may differ from the window distribution pattern in FIG. 22(b). The window distribution pattern may be discontinuously changed at a point of the light guide plate 430, which corresponds to a point of the boundary of the second touch region 320, which overlaps with the first touch region 330. The window density or the specific transparent hole area continuously increases in the case of FIG. 22, whereas the window density of the specific transparent hole area increases, decreases and then increases in the case of FIG. 25.

Figure 26:
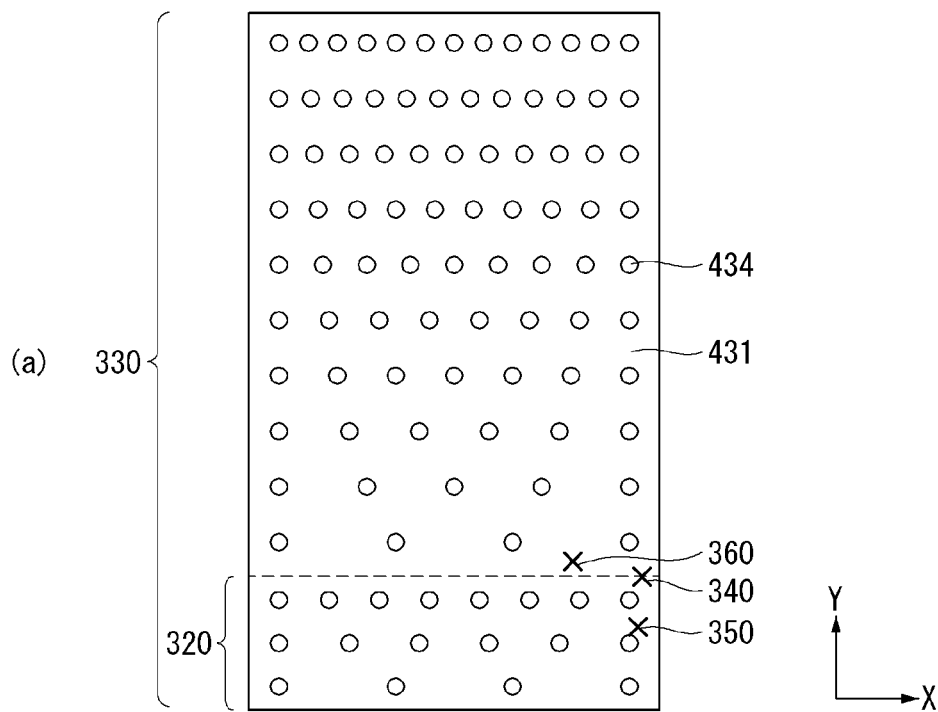
FIG. 26 illustrates spatial density of light diffusing particles in the mobile terminal of FIG. 7.
Figure 26:
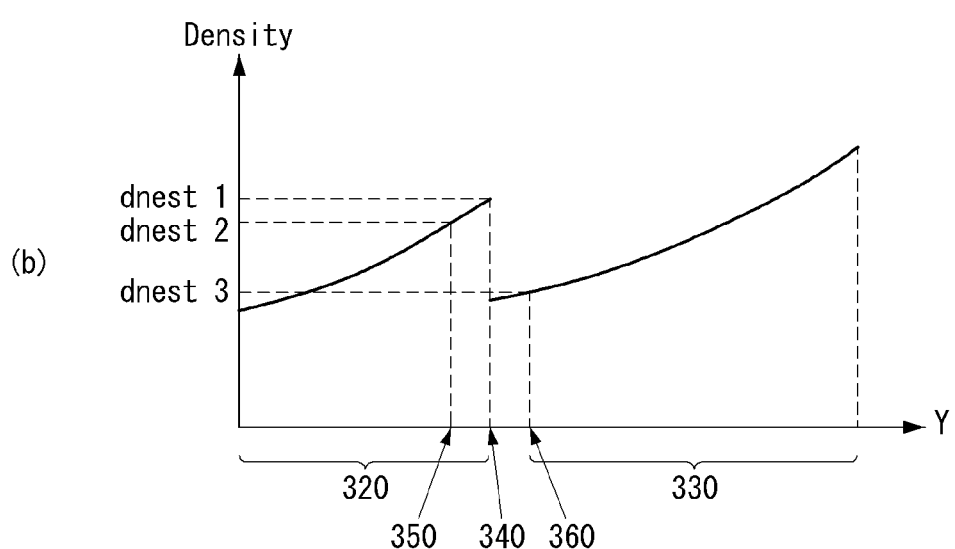

FIG. 26 illustrates density of light diffusing particles of the mobile terminal shown in FIG. 7. In FIG. 26, the second touch region 320 is located at the lower part of the glass.

A plurality of light diffusing particles 434 having the same shape may be provided. The light diffusing particles 434 may be uniformly distributed.

Spatial density of the light diffusing particles 434 may be varied along the Y-axis inside of the light guide plate body 431, as shown in FIG. 26(a). Particularly, the thickness or density of the first and second touch sensors can be discontinuously varied in the direction in which the light guide plate 430 faces the glass at the boundary of the second touch region 320 along the Y-axis. Accordingly, brightness of light provided from the light guide plate 430 to the glass may be discontinuous and thus the brightness of light provided from the light guide plate 430 to the glass can be controlled by adjusting spatial density of the light diffusing particles 434 at a portion of the light guide plate 430, which corresponds to the boundary of the second touch region 320.

Spatial density of the light diffusing particles 434 can be represented as a graph, as shown in FIG. 26(b). FIG. 26(b) represents FIG. 26(a) as a graph along the Y-axis. Spatial density dnst1 of the light diffusing particles 434 at the first point 340 may be higher than spatial density dnst2 of the light diffusing particles 434 at the second point 350. Furthermore, spatial density dnst2 may be higher than spatial density dnst3 of the light diffusing particles 434 at the third point 360.

Figure 27:
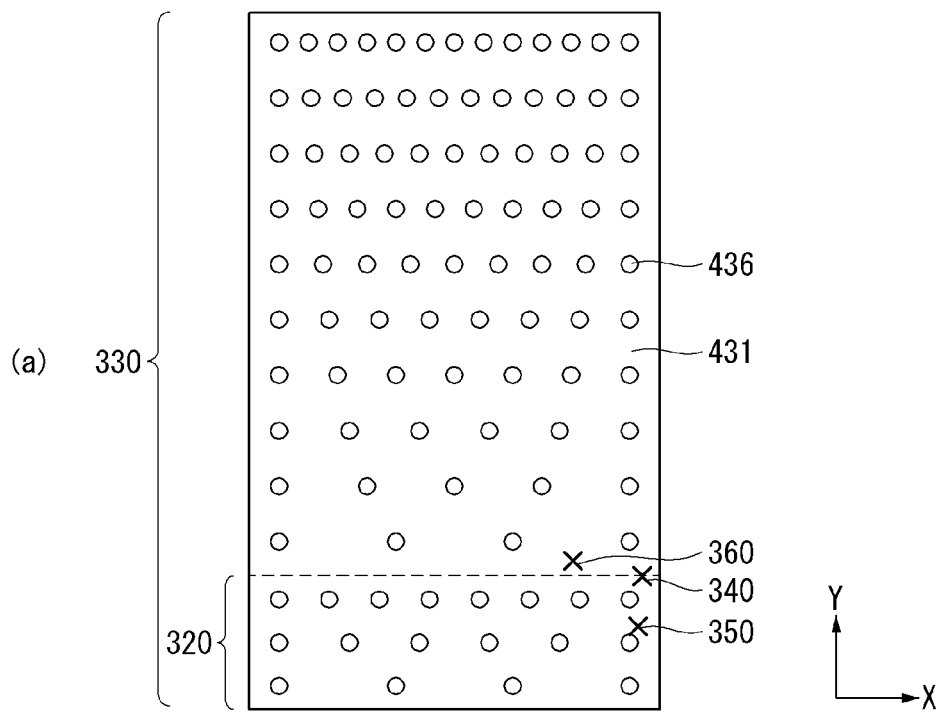
FIG. 27 illustrates spatial density of a lower pattern in the mobile terminal of FIG. 7.
Figure 27:
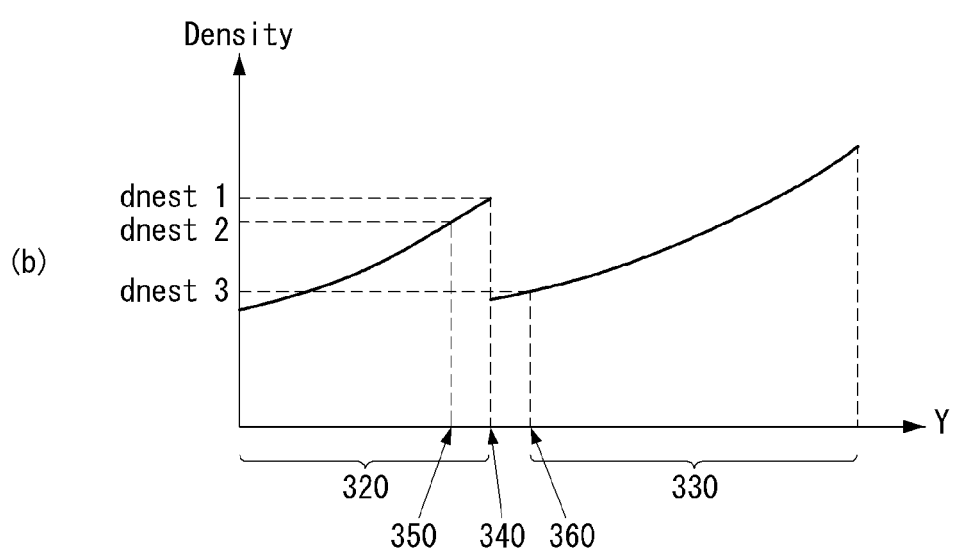

FIG. 27 illustrates spatial density of the lower pattern of the mobile terminal shown in FIG. 7. In FIG. 27, the second touch region 320 is located at the lower part of the glass.

The lower pattern 436 may include a plurality of elements having the same shape. The elements of the lower pattern 436 may be uniformly distributed.

Spatial density of the lower pattern 436 may be varied along the Y-axis inside of the light guide plate body 431 or on one side of the light guide plate body 431, as shown in FIG. 27(a). The thickness or density of the first and second touch sensors can be discontinuously varied in the direction in which the light guide plate 430 faces the glass at the boundary of the second touch region 320 along the Y-axis. Accordingly, brightness of light provided from the light guide plate 430 to the glass may be discontinuous. Accordingly, the brightness of light provided to the glass can be controlled by adjusting spatial density of the lower pattern 436 at a portion of the light guide plate 430, which corresponds to the boundary of the second touch region 320.

Spatial density of the lower pattern 436 can be represented as a graph, as shown in FIG. 27(b). Spatial density dnst1 of the lower pattern 436 at the first point 340 may be higher than spatial density dnst2 of the lower pattern 436 at the second point 350, and spatial density dnst2 may be higher than spatial density dnst3 of the lower pattern 436 at the third point 360.

Figure 28:
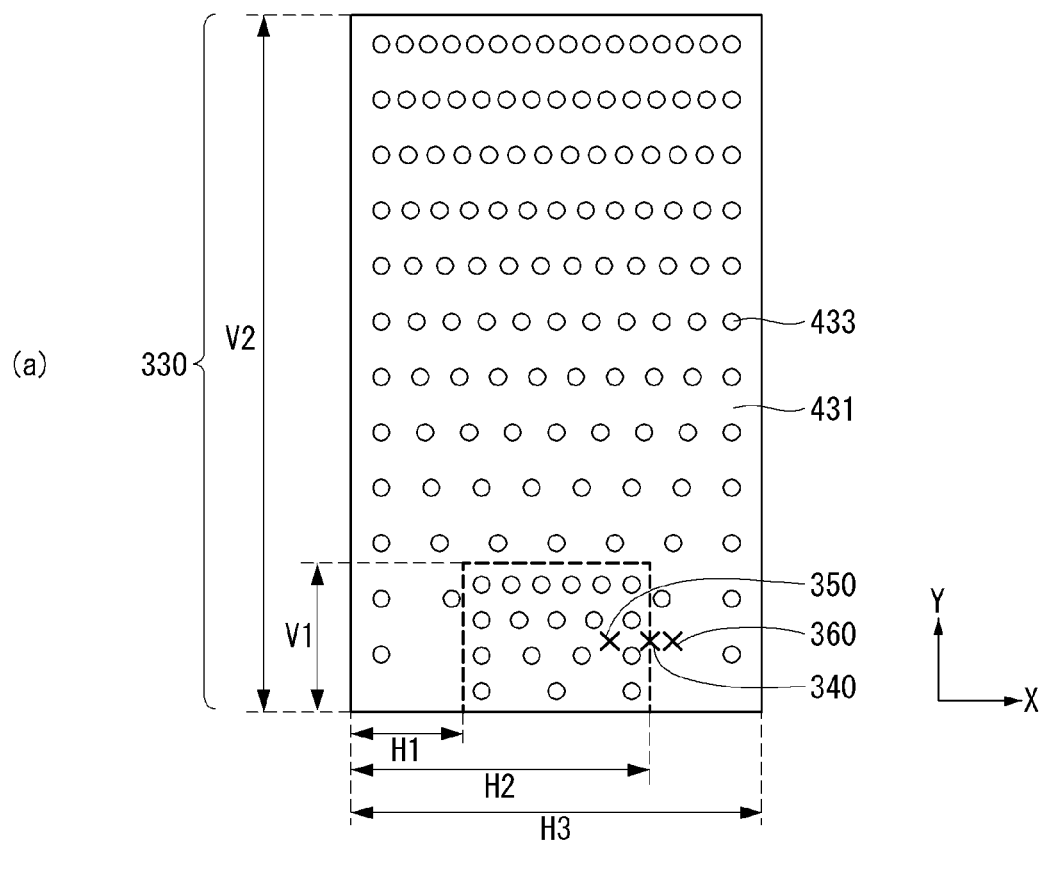
FIG. 28 illustrates spatial density of a window in the mobile terminal of FIG. 8.
Figure 28:
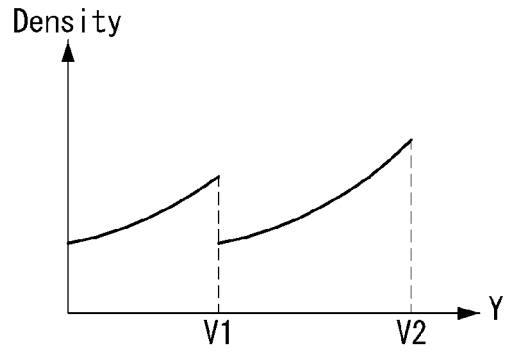
Figure 28:
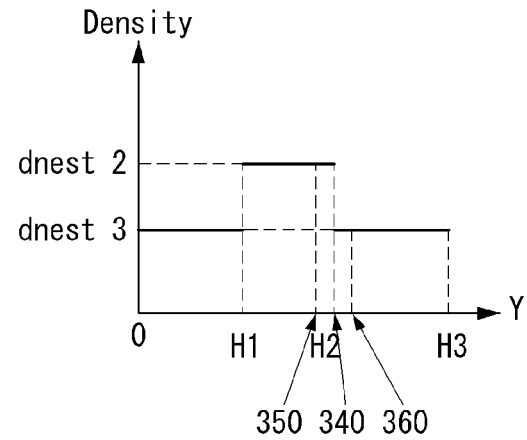

FIG. 28 illustrates spatial density of the windows of the mobile terminal of FIG. 8. In FIG. 28, the windows 433 may have the same shape. Referring to FIG. 8, the second touch region 320 is located at the center of the lower part of the glass (in the X-axis direction). Spatial density in a direction A-A' in FIG. 8 is shown in FIG. 28(b) and spatial density in a direction B-B' in FIG. 8 is shown in FIG. 28(c).

In FIG. 28(a), a region defined by a dotted line is a region of the light guide plate 430, which corresponds to the second touch region 320. That is, the dotted line is a line on the light guide plate 430, which corresponds to a portion of the boundary of the second touch region 320, which overlaps with the first touch region 330. As shown in FIG. 28(a), the spatial density or the specific transparent hole area of the windows 433 can continuously increase as the distance from the light source increases and can discontinuously vary at a portion of the light guide plate 430, which corresponds to the boundary between the second touch region 320 and the first touch region 330.

A window density pattern along the Y-axis is as shown in FIG. 28(b). When a distance between the start point of the Y-axis and a point on the Y-axis is V1 and a distance between the start point and the edge of the light guide plate 430 is V2, density of the windows 433 increases until V1, is discontinuous or decreases at V1 and increases until V2.

The window density pattern along the X-axis is as shown in FIG. 28(c). When distances between the start point of the X-axis and points on the X-axis are H1 and H2 and a distance between the start point and the edge of the light guide plate 430 is H3, the density of the windows 433 is uniform along the X-axis, abruptly increases or discontinuously increases at H1 and then remains uniform, and abruptly decreases or discontinuously decreases at H3, as shown in FIG. 28(c). In FIG. 28(c), the density of the windows 433 may increase or decrease rather than being uniform in sections 0 to H1, H1 to H2 and H2 to H3. However, the spatial density of the windows 433, shown in FIG. 28(c), is characterized in that the spatial density abruptly increases or discontinuously increases at H1 and abruptly decreases or discontinuously decreases at H2.

As shown in FIGS. 28(a), 28(b) and 28(c), density dnst2 of the windows 433 at the second point 350 may be equal to or higher than density dnst3 of the windows 433 at the third point 360. The specific transparent hole area at the second point 350 may be equal to or wider than the specific transparent hole area at the third point 360.

Figure 29:
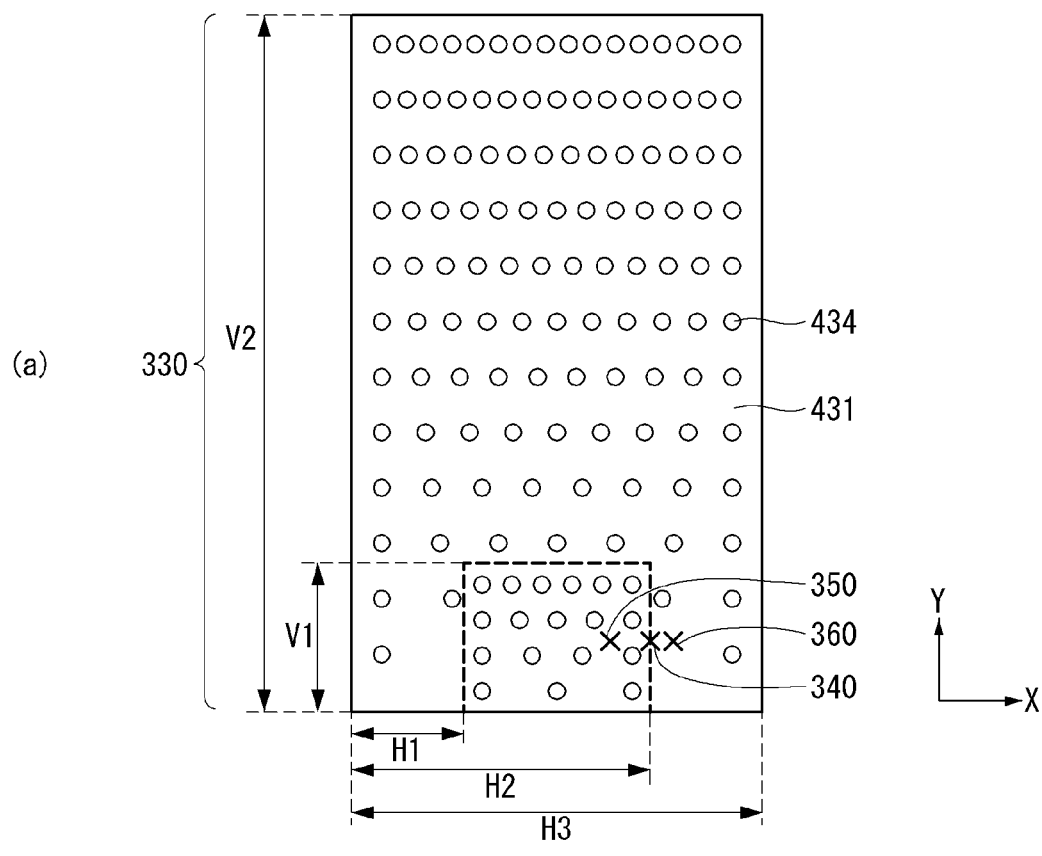
FIG. 29 illustrates spatial density of light diffusing particles in the mobile terminal of FIG. 8.
Figure 29:
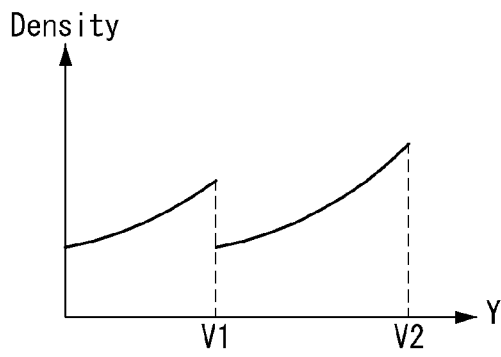
Figure 29:
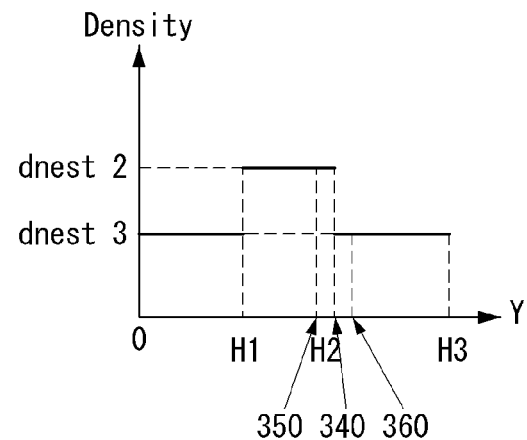

FIG. 29 illustrates density of the light diffusing particles of the mobile terminal shown in FIG. 8. In FIG. 29, the light diffusing particles 434 may have the same shape and may be uniformly distributed. In FIG. 29(a), a region defined by a dotted line is a region of the light guide plate 430 corresponding to the second touch region 320. That is, the dotted line is a line on the light guide plate 430, which corresponds to a portion of the boundary of the second touch region 320, which overlaps with the first touch region 330.

As shown in FIG. 29(a), the spatial density of the light diffusing particles 434 can continuously increase as the distance from the light source increases and can discontinuously vary at a portion of the light guide plate 430, which corresponds to the boundary between the second touch region 320 and the first touch region 330.

A spatial density pattern of the light diffusing particles 434 is shown in FIG. 29(b). When a distance between the start point of the Y-axis and a point on the Y-axis is V1 and a distance between the start point and the edge of the light guide plate 430 is V2, density of the light diffusing particles 434 increases until V1, is discontinuous or decreases at V1 and increases until V2.

The spatial density of the light diffusing particles 434 along the X-axis is shown in FIG. 29(c). The spatial density of the light diffusing particles 434 is uniform along the X-axis, abruptly increases or discontinuously increases at H1 and then remains uniform, and abruptly decreases or discontinuously decreases at H3, as shown in FIG. 29(c). In FIG. 29(c), the spatial density of the light diffusing particles 434 may have a quasi-uniform pattern rather than being uniform in sections 0 to H1, H1 to H2 and H2 to H3. However, the spatial density of the light diffusing particles 434, shown in FIG. 29(c), is characterized in that the spatial density abruptly increases or discontinuously increases at H1 and abruptly decreases or discontinuously decreases at H2.

Figure 30:
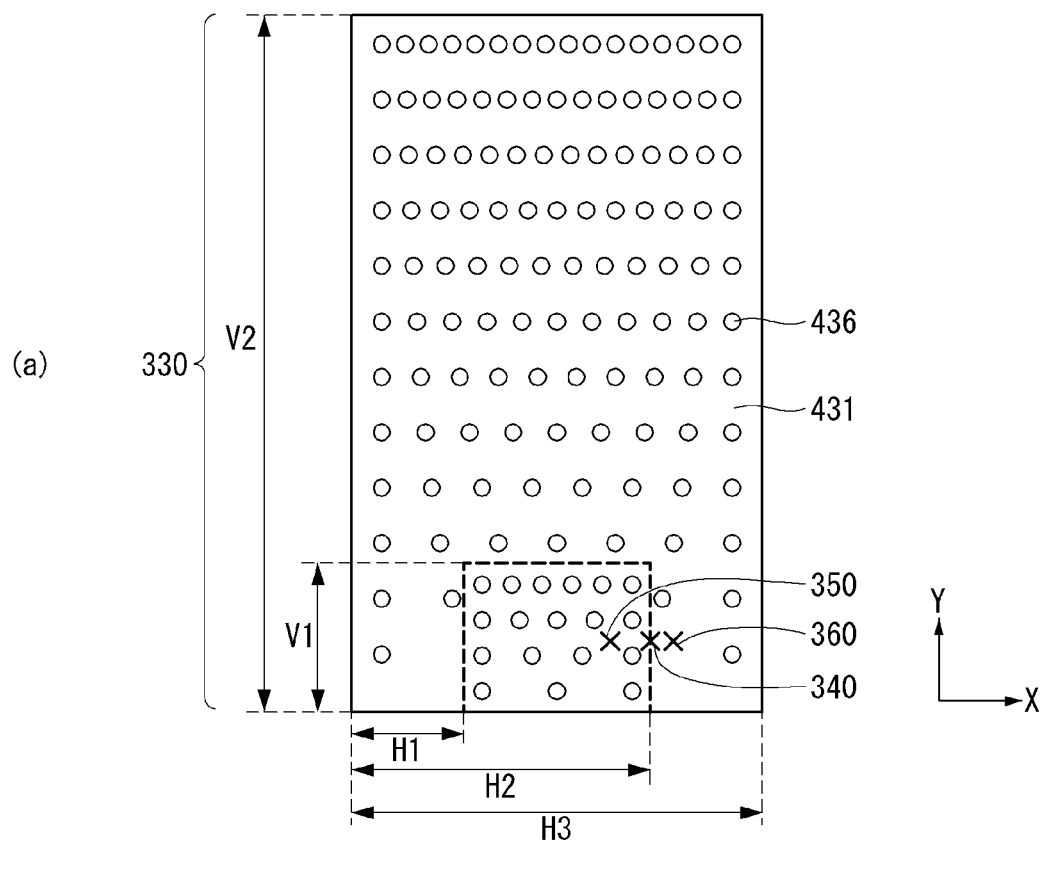
FIG. 30 illustrates spatial density of a lower pattern in the mobile terminal of FIG. 8.
Figure 30:
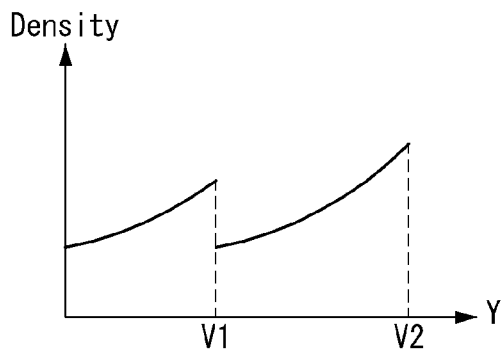
Figure 30:
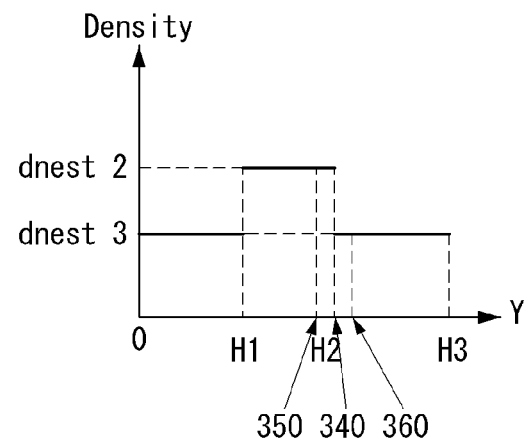

FIG. 30 illustrates density of the lower pattern of the mobile terminal shown in FIG. 8. In FIG. 30, the lower pattern 436 may have a plurality of elements having the same shape and uniformly distributed. In FIG. 30(a), a region defined by a dotted line is a region of the light guide plate 430, which corresponds to the second touch region 320. That is, the dotted line is a line on the light guide plate 430, which corresponds to a portion of the boundary of the second touch region 320, which overlaps with the first touch region 330.

As shown in FIG. 30(a), the spatial density of the lower pattern 436 can continuously increase as the distance from the light source increases and can discontinuously vary at a portion of the light guide plate 430, which corresponds to the boundary between the second touch region 320 and the first touch region 330.

A spatial density pattern of the lower pattern 436 is as shown in FIG. 30(b). The density of the lower pattern 436 increases until V1, discontinuously decreases or abruptly decreases at V1 and increases until V2.

As shown in FIG. 30(c), the spatial density of the lower pattern 436 is uniform along the X-axis, abruptly increases or discontinuously increases at H1 and then remains uniform, and abruptly decreases or discontinuously decreases at H3. In FIG. 30(c), the spatial density of the lower pattern 436 may have a quasi-uniform pattern rather than being uniform in sections 0 to H1, H1 to H2 and H2 to H3. However, the spatial density of the lower pattern 436, shown in FIG. 30(c), is characterized in that the spatial density abruptly increases or discontinuously increases at H1 and abruptly decreases or discontinuously decreases at H2.

Figure 31:
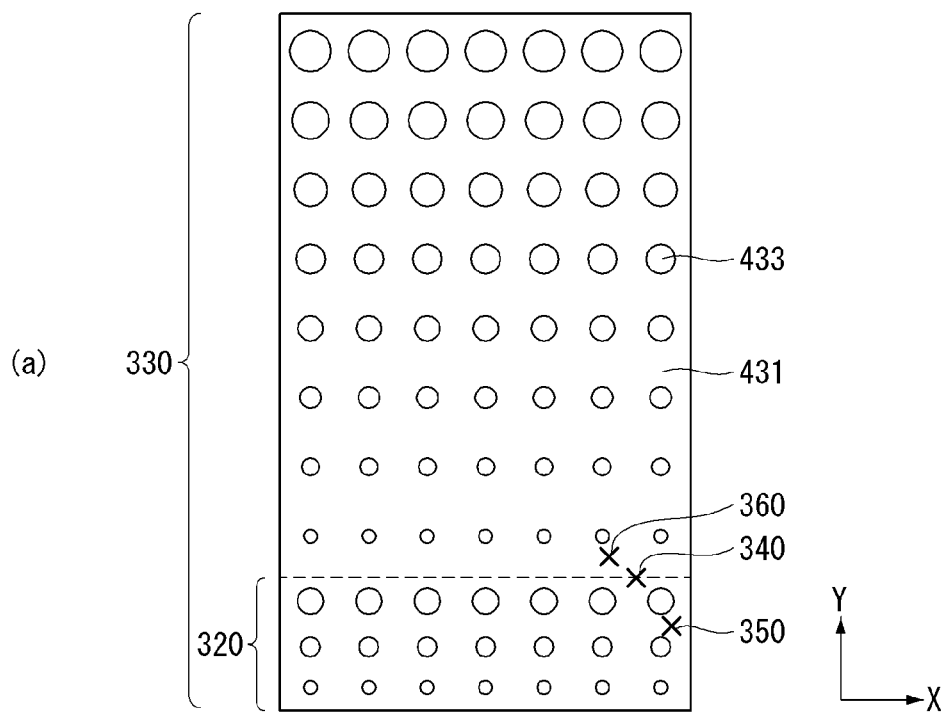
FIG. 31 illustrates the size of the window of the mobile terminal of FIG. 7.
Figure 31:
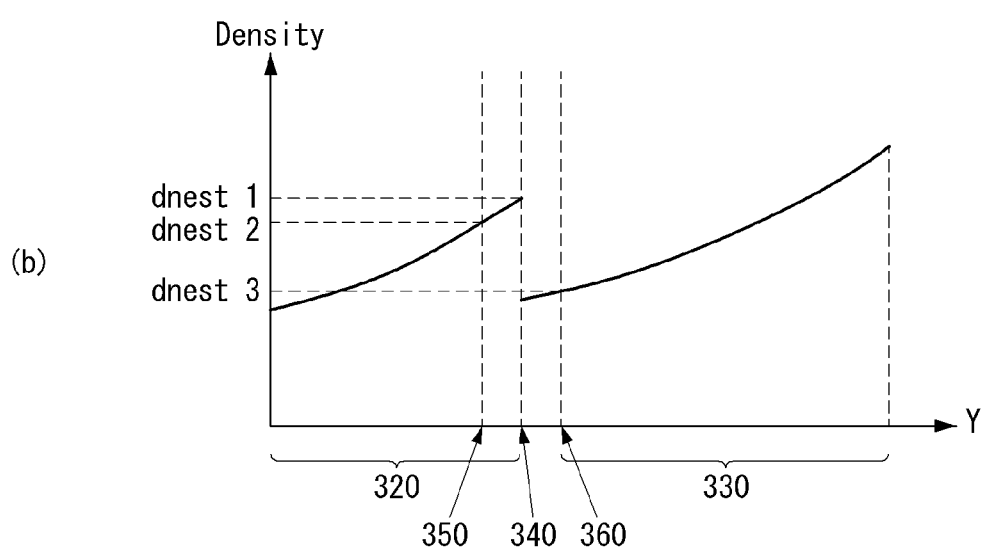

FIG. 31 illustrates the size of the windows of the mobile terminal shown in FIG. 7. In FIG. 31, the second touch region 320 is located at the lower part of the glass. While the density of the windows 433 is uniform in the area of the light guide plate 430, the size of the windows 433 may vary. When the window size increases, the quantity of light provided to the glass through the windows 433 can increase.

As shown in FIG. 31(a), the size of the windows 433 may increase as the distance from a region of the light guide plate 430, corresponding to the second touch region 320, increases in the Y-axis direction. Furthermore, the size of the windows 433 may increase as the distance from a region of the light guide plate 430, corresponding to the outside of the second touch region 320, increases in the Y-axis direction. However, the size of the windows 433 may be discontinuously varied at a portion of the light guide plate 430, which corresponds to a point of the boundary of the second touch region 320, which overlaps with the first touch region 330.

Referring to FIG. 31(b), in the second touch region 320 and an area of the first touch region 330, which corresponds to the outside of the second touch region 320, the size of the windows 433 can increase in the Y-axis direction. However, the size of the windows 433 may abruptly decrease or discontinuously decrease at a point of the boundary of the second touch region 320, which corresponds to the first touch region 330.

Figure 32:
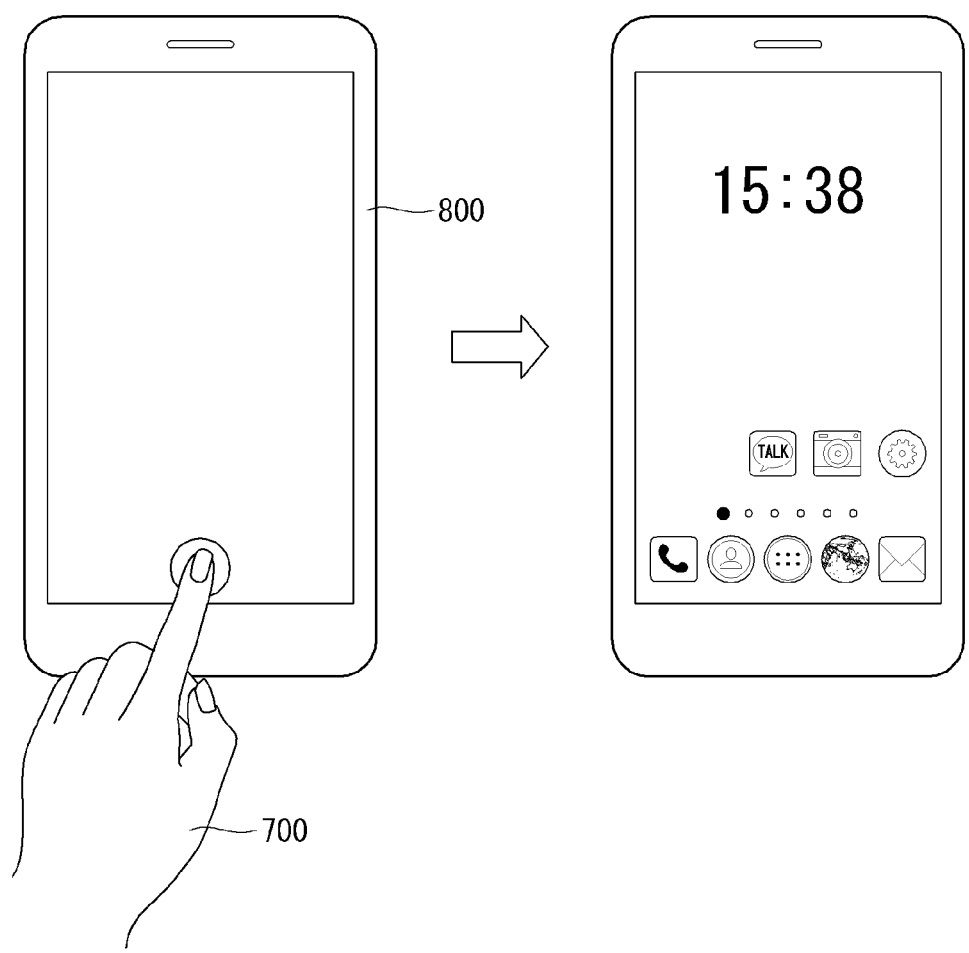
FIG. 32 illustrates change of a mobile terminal state using a fingerprint of a user according to an embodiment of the present disclosure.

A mobile terminal 800 according to an embodiment of the present invention can obtain a fingerprint of a user 700 through at least part of the glass. FIG. 32 illustrates change of the state of the mobile terminal using the fingerprint of the user according to an embodiment of the present invention.

The controller may obtain fingerprint information of the user 700 through the second touch sensor during touch operation of the user 700 through the first touch sensor and activate the mobile terminal 800 according to the touch operation and the obtained fingerprint information. For example, when the user 700 touches the second touch region in a deactivated state of the mobile terminal 800 and maintain the touch for a predetermined time, the controller can recognize a fingerprint of the user 700 and activate the mobile terminal 800. Here, the controller may be the controller 180 shown in FIG. 1(a).

When the user 700 touches the second touch region multiple times in a deactivated state of the mobile terminal 800, the controller may recognize the fingerprint of the user 700 and determine whether the mobile terminal 800 is activated. Here, the controller may obtain the fingerprint information at the end point of touch operation. For example, the controller can prepare for acquisition of the fingerprint of the user 700 by recognizing first touch of the user 700 and activate the mobile terminal 800 of a specific application by obtaining the fingerprint of the user 700 from second touch of the user 700.

Figure 33:
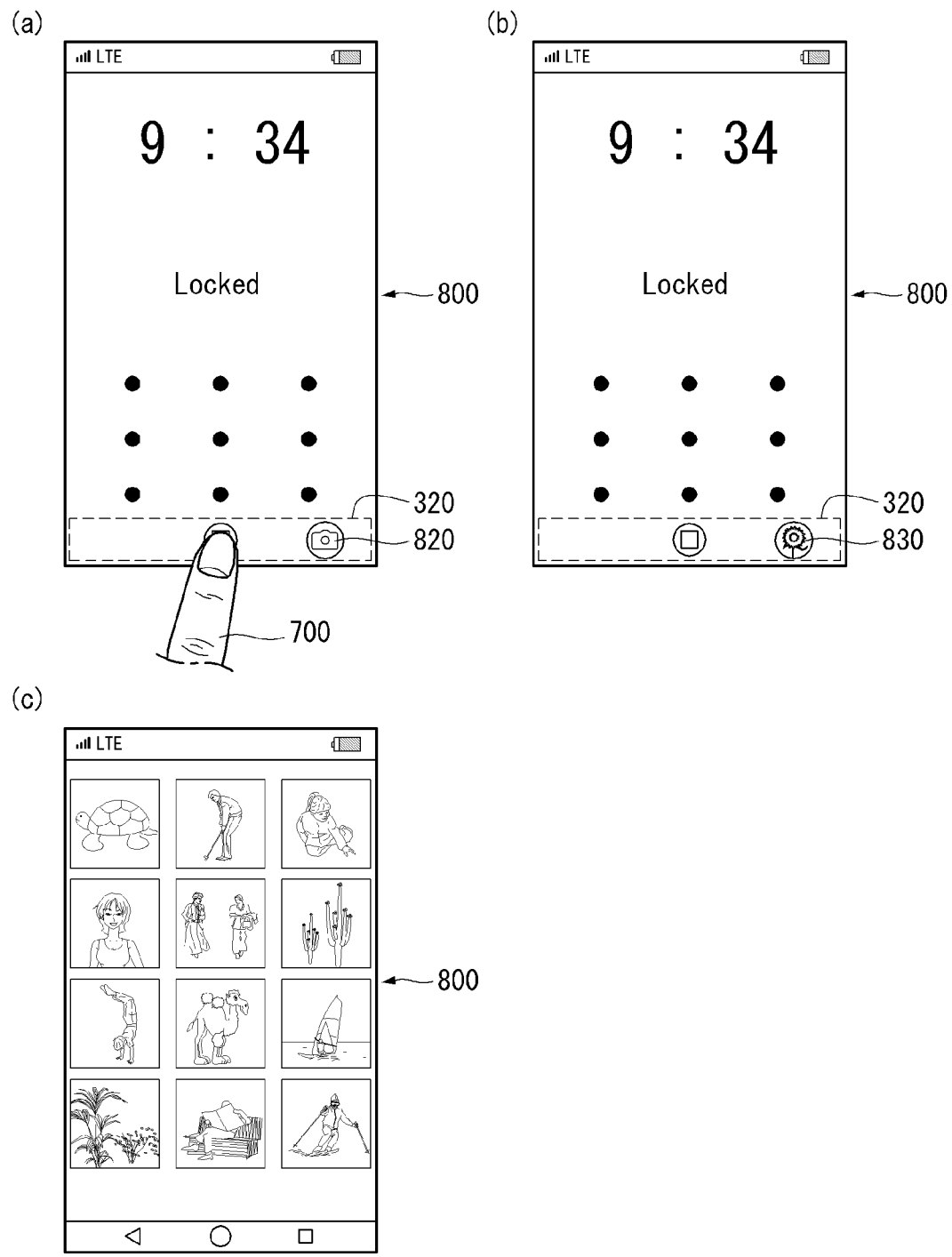
FIG. 33 illustrates a mobile terminal in which applications accessible in a locked state are changed through user fingerprint recognition according to an embodiment of the present disclosure.

FIG. 33 illustrates change of an application accessible in a locked state of the mobile terminal through user fingerprint recognition according to an embodiment of the present invention.

Referring to FIG. 33(a), the mobile terminal 800 is locked and an application less related to security, such as a camera application, can be executed in the locked mobile terminal. When the user 700 intends to directly execute an application related to security (e.g., a gallery application) through a lock screen, the user 700 can use fingerprint recognition.

When the user 700 provides the fingerprint through the second touch region 320, as shown in FIG. 33(a), the controller can identify the user 700 by obtaining the fingerprint of the user 700. Upon acquisition and authentication of the fingerprint of the user 700 through the controller, the camera application can be executed. However, when the obtained fingerprint is not authenticated, the controller can change an icon 820 linked to the camera application in a locked state to an icon 830 linked to the gallery application, as shown in FIG. 33(b). That is, different applications can be activated according to the fingerprint information obtained through the second touch region 320. Here, the different applications may be applications related to each other. For example, the camera application and the gallery application may be closely related applications. As the application accessible in the locked state of the mobile terminal according to the fingerprint information of the user 700, the galley application can be directly executed when the user 700 touches the icon 830 linked to the gallery application, as shown in FIG. 33(c).

Figure 34:
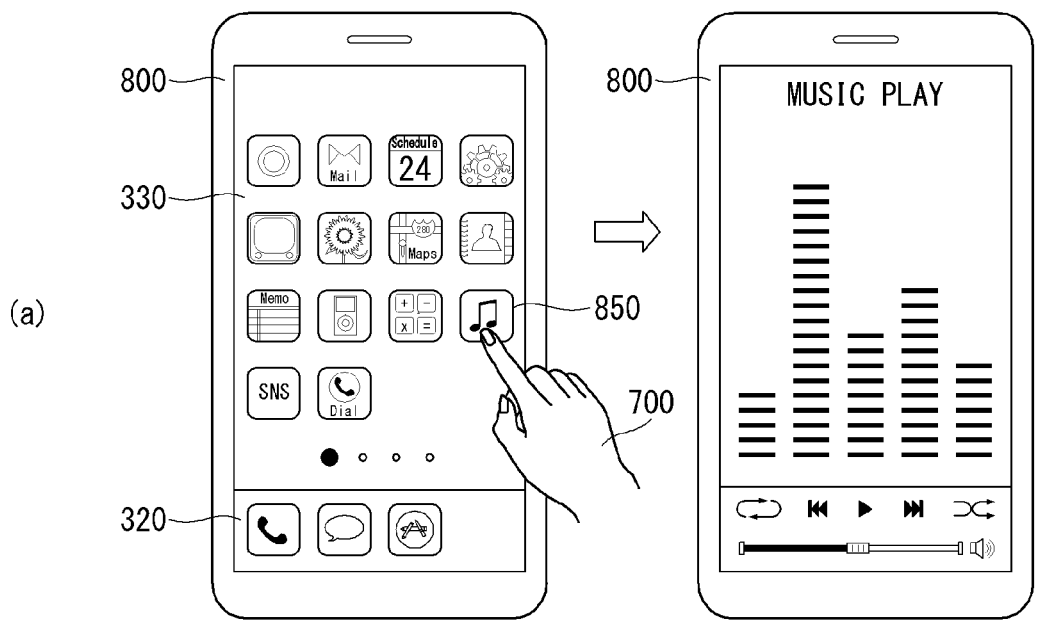
FIG. 34 illustrates a mobile terminal in which an execution mode is changed according to whether fingerprint information is provided according to an embodiment of the present disclosure.
Figure 34:
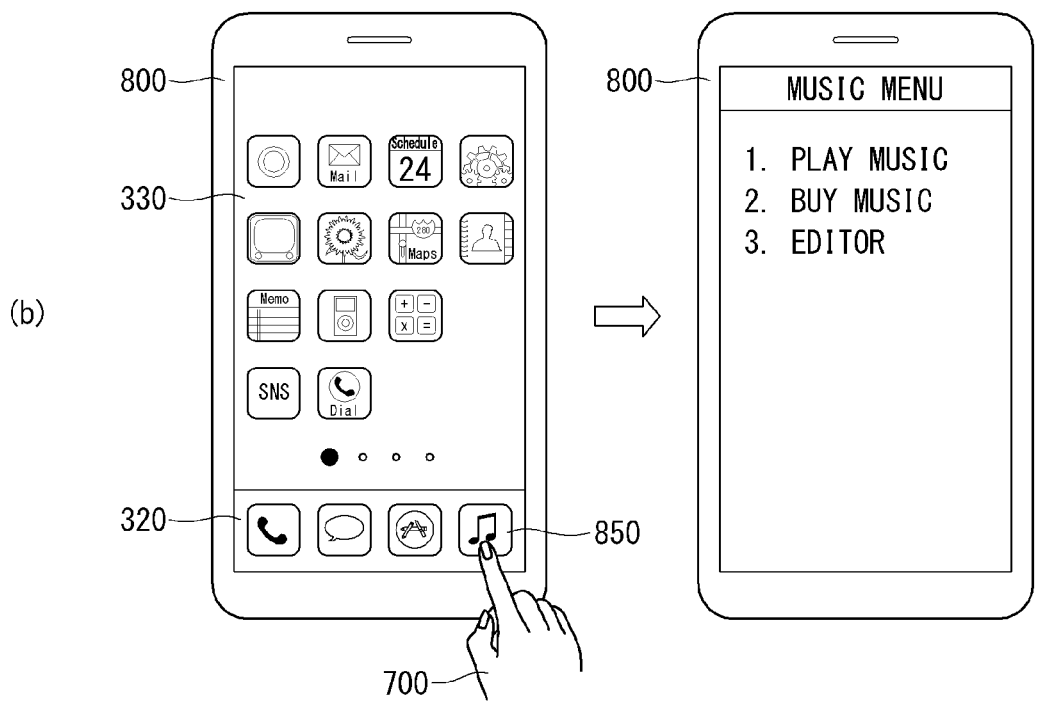

Even in the case of an icon linked to an application, the application may be executed in different modes in a case in which input applied to the icon is obtained through the first touch region 330 and in a case in which input applied to the icon is obtained through the second touch region 320. For example, when input for executing a music playback application is obtained through the first touch region 330, only a music file stored in the mobile terminal 800 can be played, as shown in FIG. 34(a). When input for executing the music playback application is obtained through the second touch region 320, the controller can not only control a music file stored in the mobile terminal 800 to be played but also enable the user to purchase a sound source in on-line sound source markets or to edit a music file stored in the mobile terminal 800, as shown in FIG. 34(b).

When the fingerprint information obtained through the second touch region 320 is authenticated, the controller can activate an execution mode in which sound source purchase requiring identification of the user 700 is available, as shown in FIG. 34(b). When the fingerprint information obtained through the second touch region 320 is not authenticated, the controller can activate an execution mode in which a music file requiring no identification of the user 700 can be played, as shown in the right part of FIG. 34(a). That is, the controller can differently activate the execution mode of an application linked to an icon located in the second touch region 320 according to fingerprint information obtained through the icon.

Figure 35:
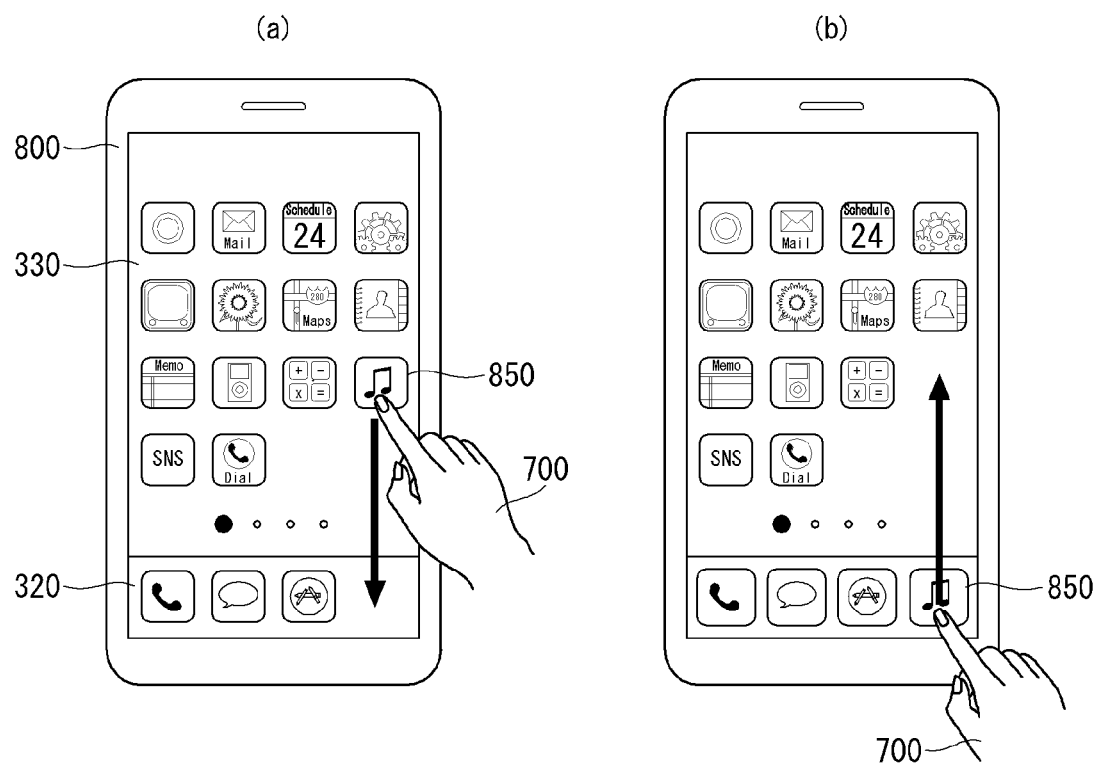
FIG. 35 illustrates a mobile terminal in which icons can be moved according to an embodiment of the present disclosure.

The controller may obtain first input of moving an icon 850 located in the first touch region 330 outside of the second touch region 320 to the second touch region 320 through drag-and-drop. That is, the user 700 can move the icon 850 from the first touch region 330 outside of the second touch region 320 to the inside of the second touch region 320 through drag-and-drop, as shown in FIG. 35(a).

The controller can activate an application linked to the icon 850 located in the second touch region according to fingerprint information obtained through the icon 850. That is, the controller can differently activate the execution mode of the application linked to the icon according to whether the fingerprint obtained through the second touch sensor 404 is authenticated.

The controller may obtain second input of moving the icon 850 located in the second touch region 320 to a portion of the first touch region 330, outside of the second touch region 320, according to drag-and-drop. That is, the user 700 can move the icon 850 from the second touch region 320 to the outside of the second touch region 320 through drag-and-drop, as shown in FIG. 35(b). The controller can activate the application linked to the icon 850 according to input obtained through the first touch sensor 402.

While it is desirable that the icon 850 linked to the application which requires fingerprint information be located in the second touch region 320, a case in which the icon 850 is located in the first touch region 330 outside of the second touch region 320 may be considered.

Figure 36:
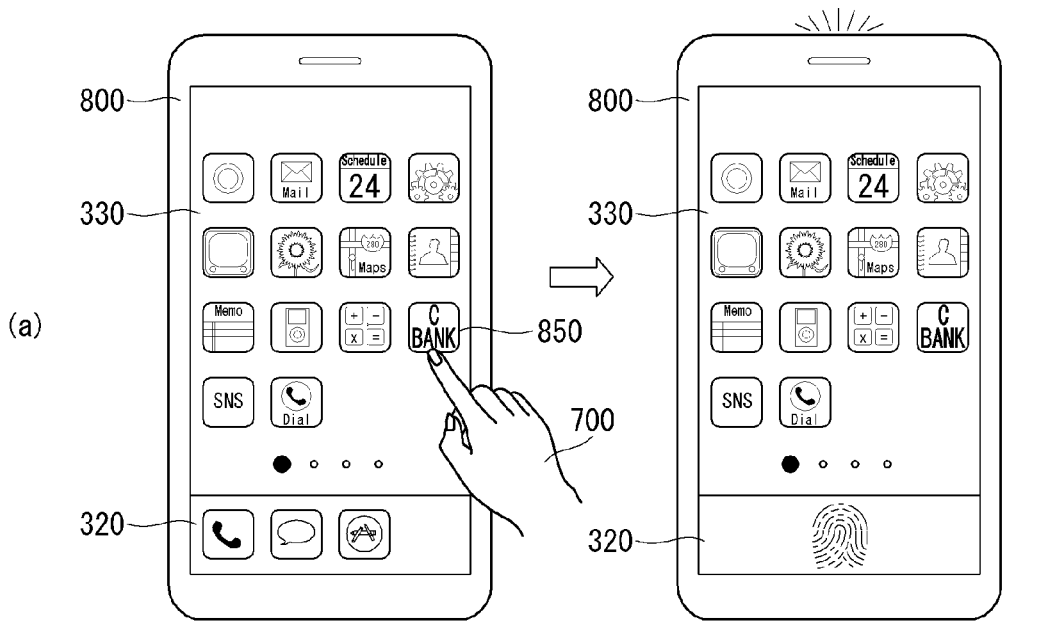
FIG. 36 illustrates a mobile terminal operating when an icon linked to an application requiring fingerprint information is located outside of the second touch region according to an embodiment of the present disclosure.
Figure 36:
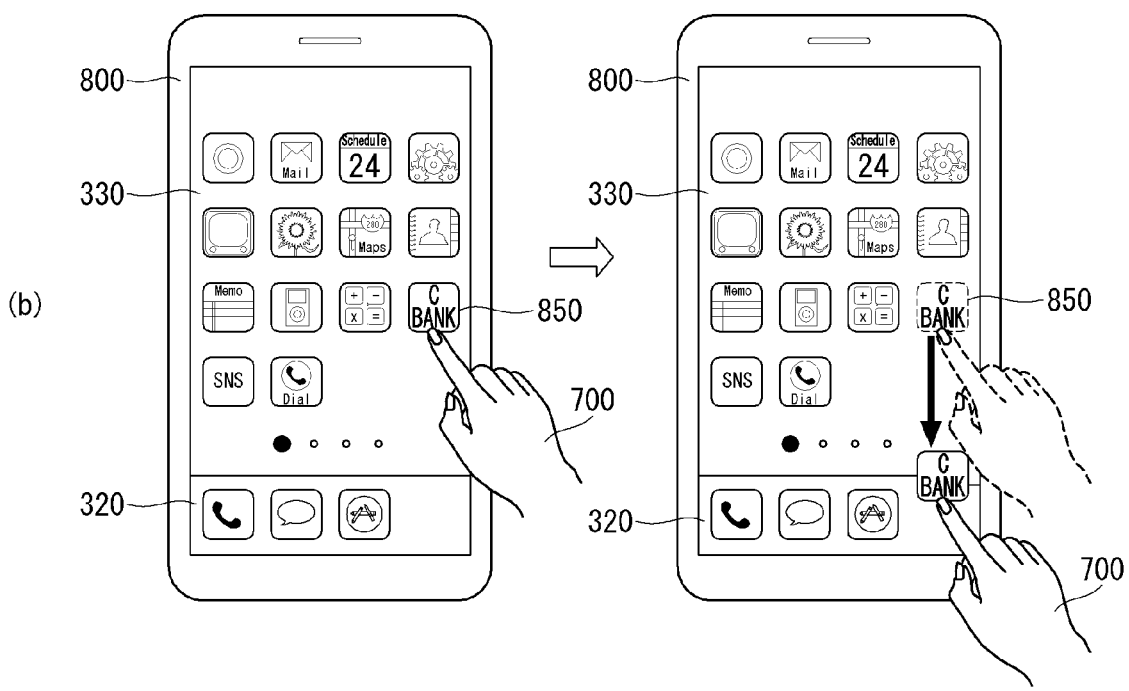

When the user 700 executes the application requiring fingerprint information even when the icon 850 linked to the application is located in the first touch region 330 outside of the second touch region 320, the controller may induce the user 700 to input their fingerprint by changing the color or brightness of the second touch region 320 while outputting an audible alarm, for example, as shown in FIG. 36(a).

When the icon 850 linked to the application requiring fingerprint information is located in the first touch region 320 outside of the second touch region 320 and the user 700 intends to execute the application without moving the icon 850 to the second touch region 320 although the user 700 recognizes the position of the icon 850, the controller may obtain fingerprint information through drag-and-hold, for example, as shown in FIG. 36(b). That is, when the user 700 drags the icon 850 to the second touch region 320 and then maintains the icon 850 for a predetermined time, the controller can obtain the fingerprint information of the user 700 through the second touch sensor 404.

Figure 37:
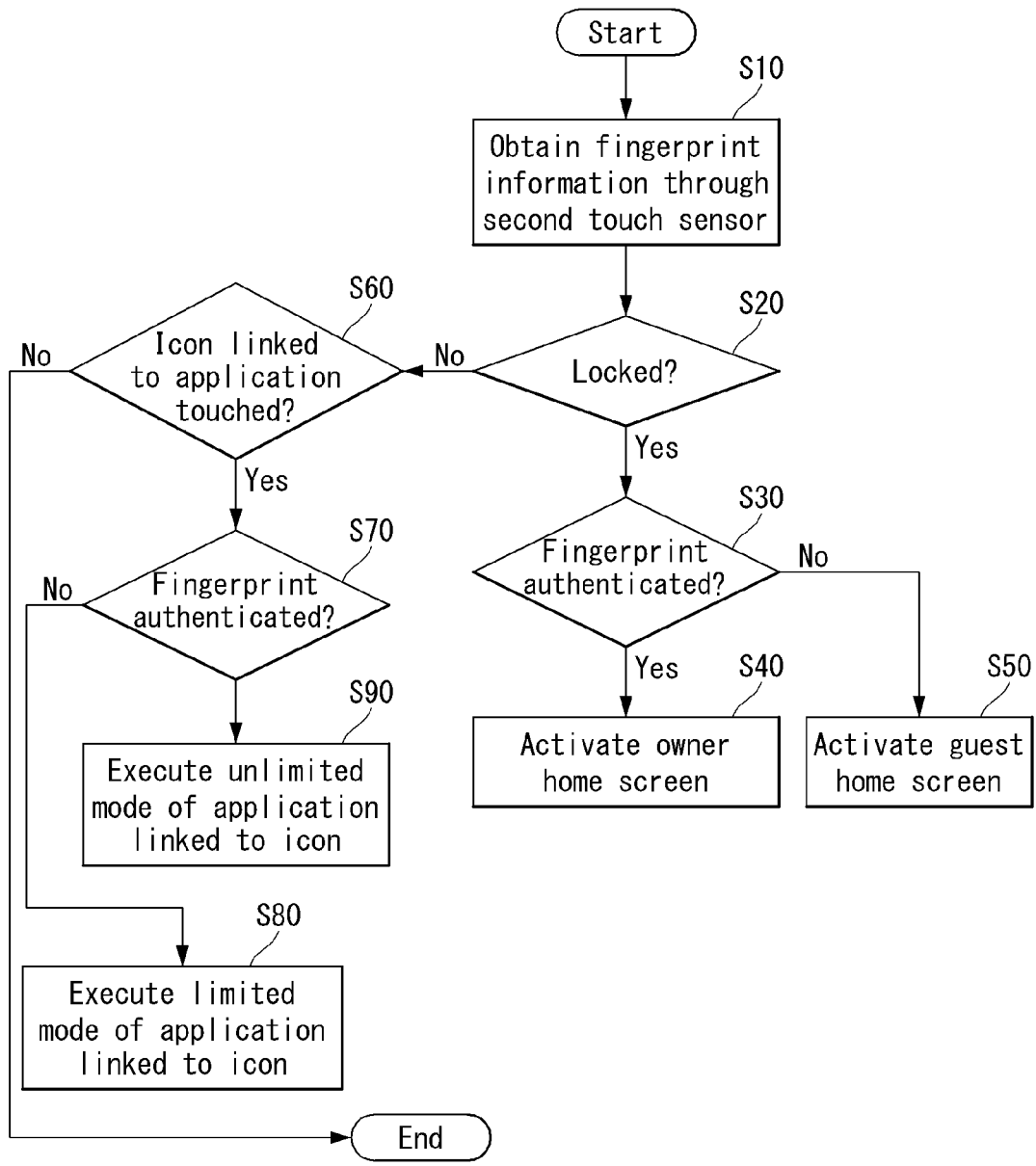
FIG. 37 is a flowchart illustrating use of fingerprint information in the mobile terminal according to an embodiment of the present disclosure.

Security of the mobile terminal can be implemented using fingerprint information. As shown in FIG. 37, the controller of the mobile terminal can obtain fingerprint information through the second touch sensor 404 (S10). Here, operation of the mobile terminal may depend on whether the mobile terminal is locked or not (S20). When the mobile terminal is locked, whether the fingerprint obtained through the second touch sensor 4040 is authenticated is checked (S30). When the obtained fingerprint is authenticated, the controller can activate an "owner home screen" of the mobile terminal, which can be used by the owner of the mobile terminal (S40). When the obtained fingerprint is not authenticated, the controller can activate a "guest home screen" of the mobile terminal, which can be used by anyone (S50).

When the mobile terminal is not locked, operation of the mobile terminal may depend on whether an icon linked to an application is touched (S60). When the icon is touched, whether the fingerprint obtained through the second touch sensor 404 is authenticated is checked (S70). When the obtained fingerprint is authenticated, the controller can control the application linked to the icon to be executed without restriction (S90).

When the obtained fingerprint is not authenticated, the controller can control the application linked to the icon to be restrictively executed (S80). For example, the application can be executed with a specific function thereof restricted, the execution of the application can be restricted or the mobile terminal can be locked such that access to the mobile terminal is restricted.

When the icon is not touched, the controller can discard the fingerprint information obtained through the second touch sensor 404 and wait for the next signal input.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a glass panel having a first touch region and a second touch region, the second touch region located at least partially within the first touch region and configured to obtain fingerprint information, wherein the second touch region is located at a lower portion of the glass panel;
   an optical sheet provided at the back side of the glass;
   a touch screen having a first touch sensor and a second touch sensor located on a different layer from the first touch sensor, the touch screen having a first area corresponding to the first touch region and a second area corresponding to the second region,
   the first touch sensor and the second touch sensor are interposed between the glass and the light sheet,
   the first touch sensor corresponding to the first touch region, the second touch sensor corresponding to the second touch region;
   a light guide plate provided at the backside of the first and second touch sensors; and
   a light source provided at a side of the light guide plate, wherein the light guide plate comprises:
   a light guide plate body that propagates light generated from the light source, and
   a plurality of windows provided at a side of the light guide plate body that faces the glass panel, the windows being arranged outside of the second touch region and having at least one of a non-uniform distribution or varying sizes,
   wherein the windows are arranged such that a brightness of light provided to the second touch sensor is greater than the brightness of light provided to a region of the glass panel outside of the second touch sensor,
   wherein the windows continuously vary in the first touch region and the second touch region, and the windows discontinuously vary around a boundary of the second touch region,
   wherein the windows in a location corresponding to the inside of the second touch region are more densely distributed than the windows in a location corresponding to the outside of the second touch region,
   wherein the light guide plate further comprises:
   light diffusing particles provided in the light guide plate body that diffuse light so that a brightness of the second touch region is substantially the same as a brightness of the first touch region,
   wherein a density of the light diffusing particles provided in an area corresponding to the first touch region is different than a density of light diffusing particles provided in an area corresponding to the second touch region,
   wherein a spatial density of the light diffusing particles varies around a boundary of the second touch region, and
   wherein a thickness of the second touch region is greater than a thickness of the portion of the first touch region due to the second touch sensor is laminated on the first touch sensor in the thickness direction of the mobile terminal.

2. The mobile terminal of claim 1, wherein first light diffusing particles corresponding to the second touch region and second light diffusing particles corresponding to a region other than the second touch region are equal distance from the light source, and wherein the first light diffusing particles have a different spatial density compared to the second light diffusing particles.

* * * * *